H. W. B. GRAHAM.
APPARATUS FOR MAKING BRICKS.
APPLICATION FILED MAR. 1, 1916.
1,341,798.
Patented June 1, 1920.
10 SHEETS—SHEET 1.
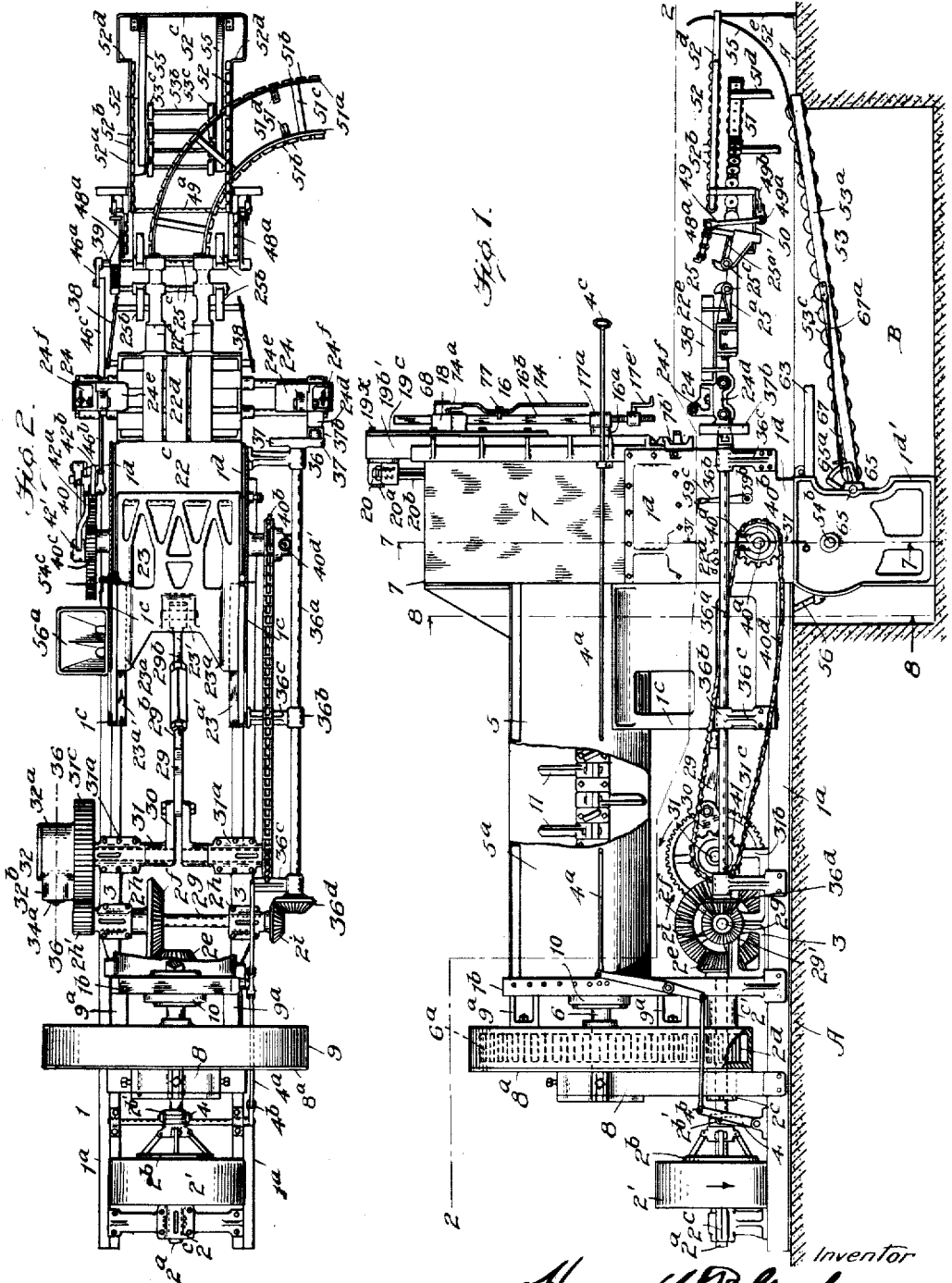

H. W. B. GRAHAM.
APPARATUS FOR MAKING BRICKS.
APPLICATION FILED MAR. 1, 1916.
1,341,798.
Patented June 1, 1920.
10 SHEETS—SHEET 2.
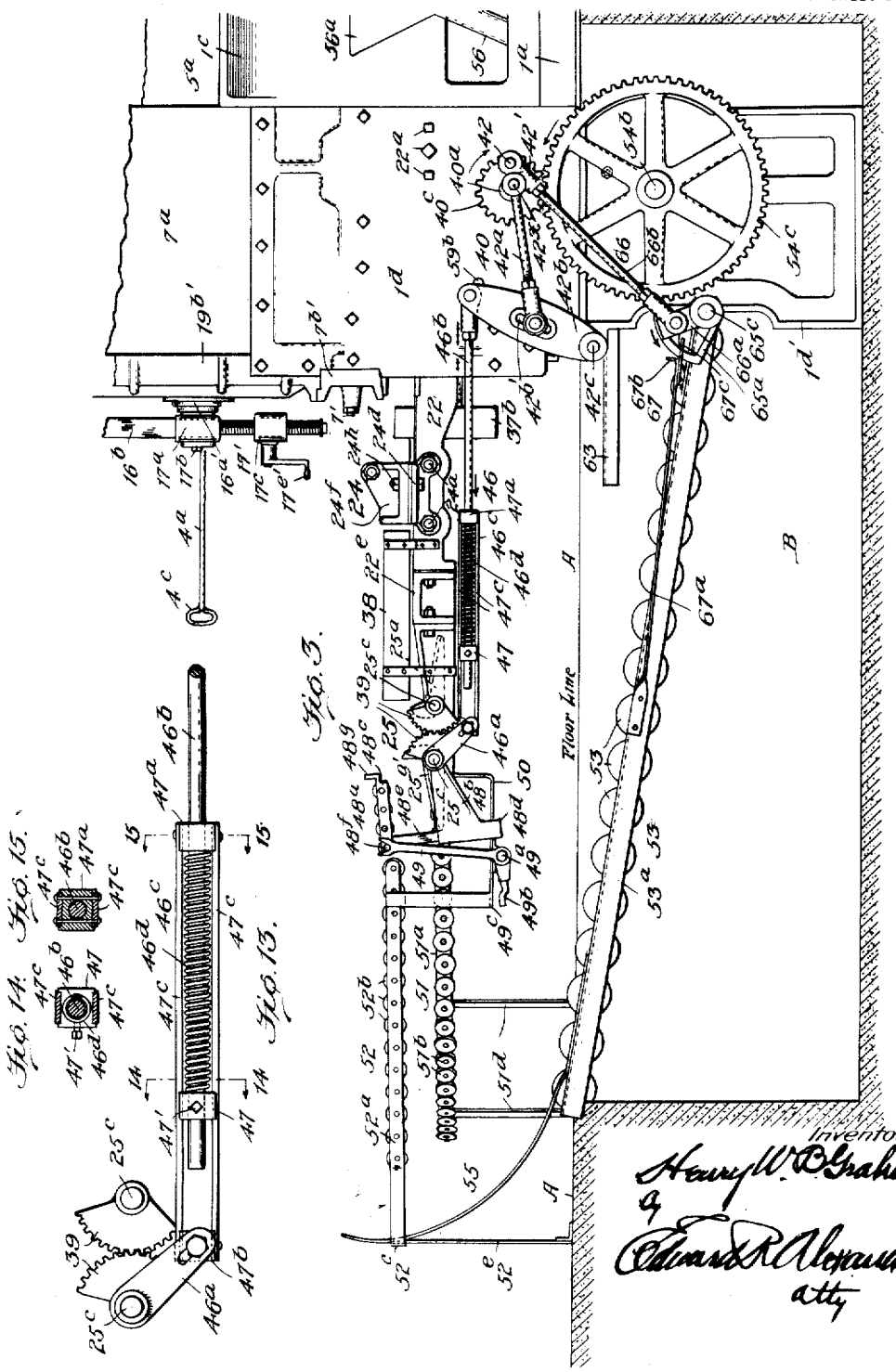

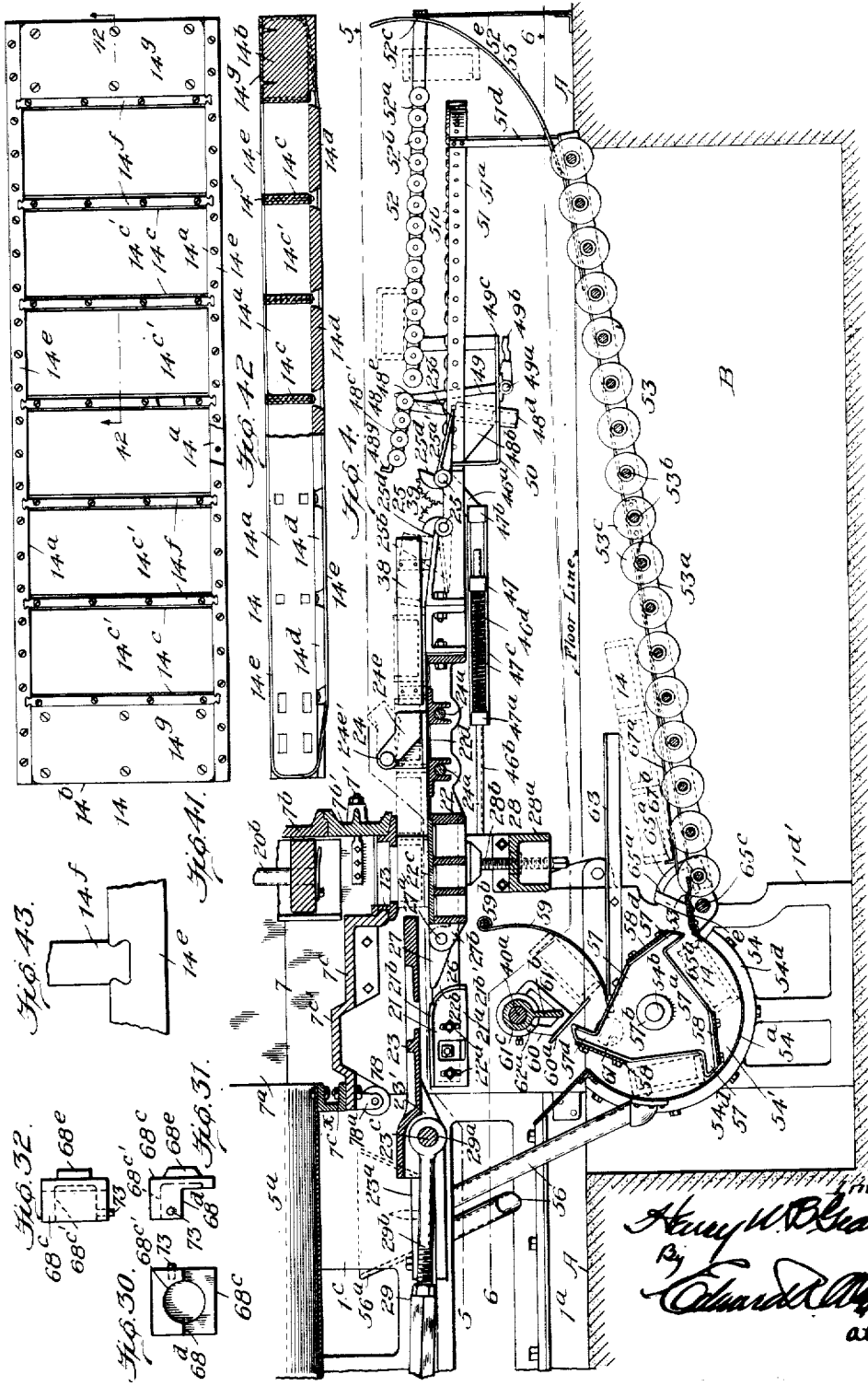

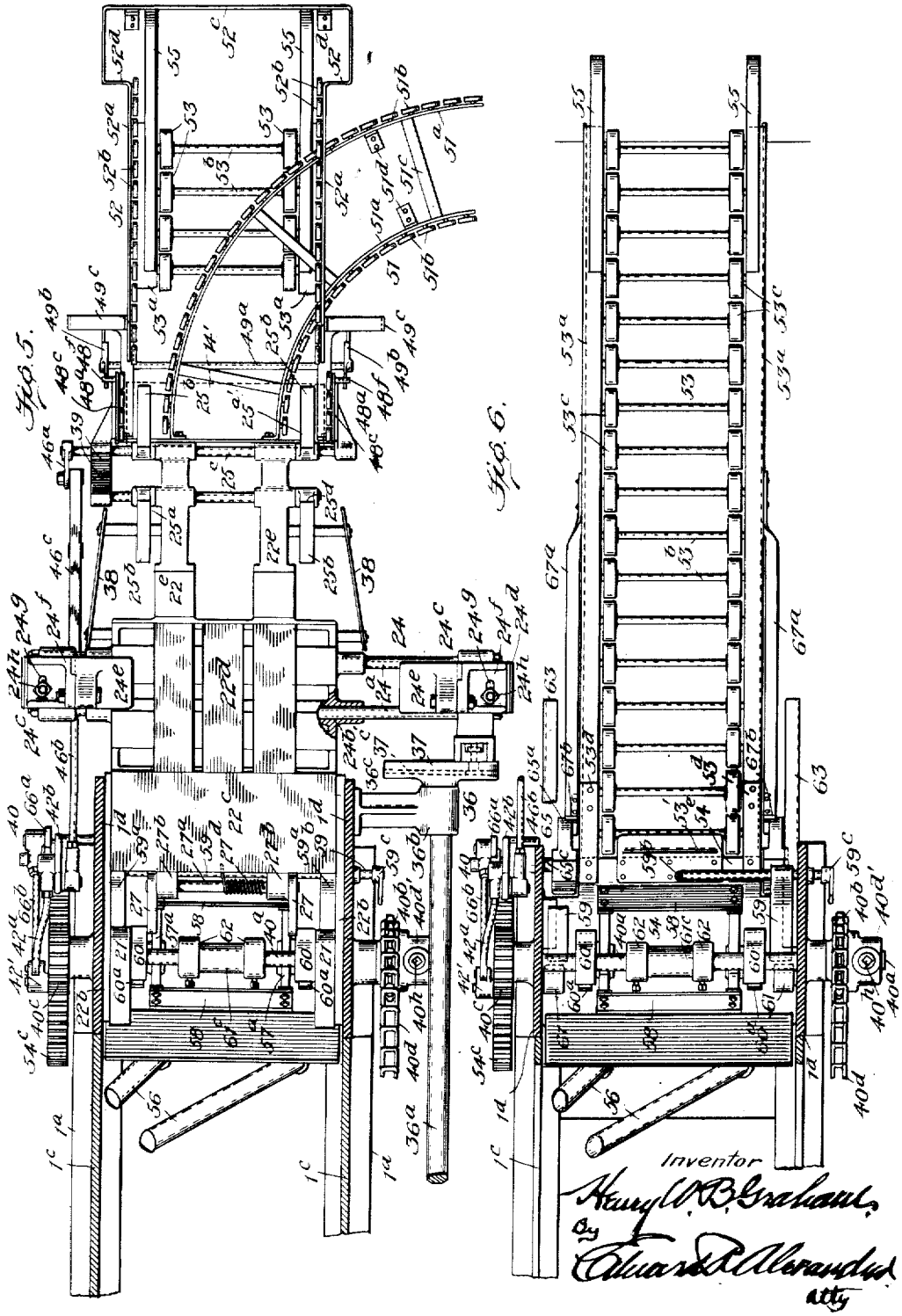

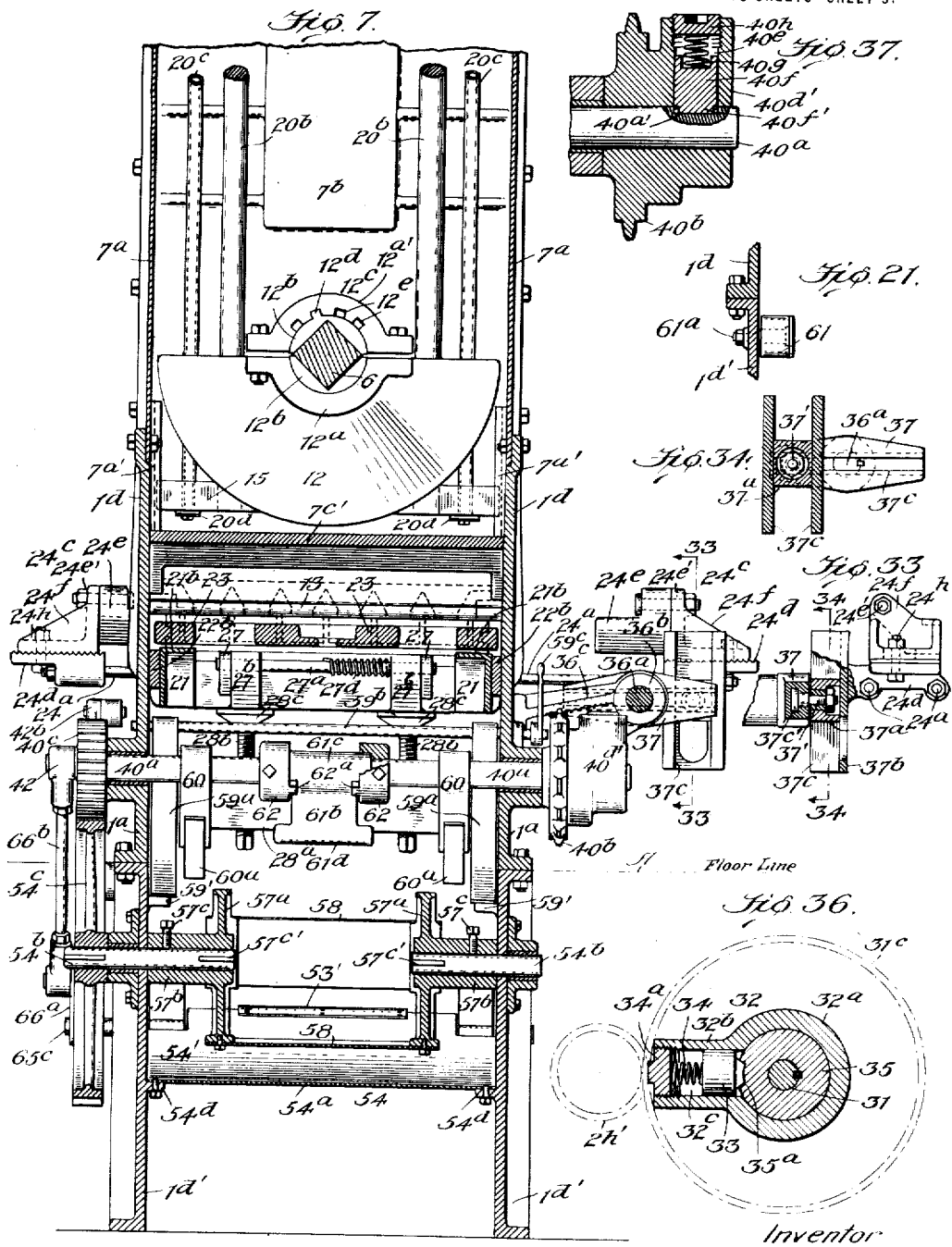

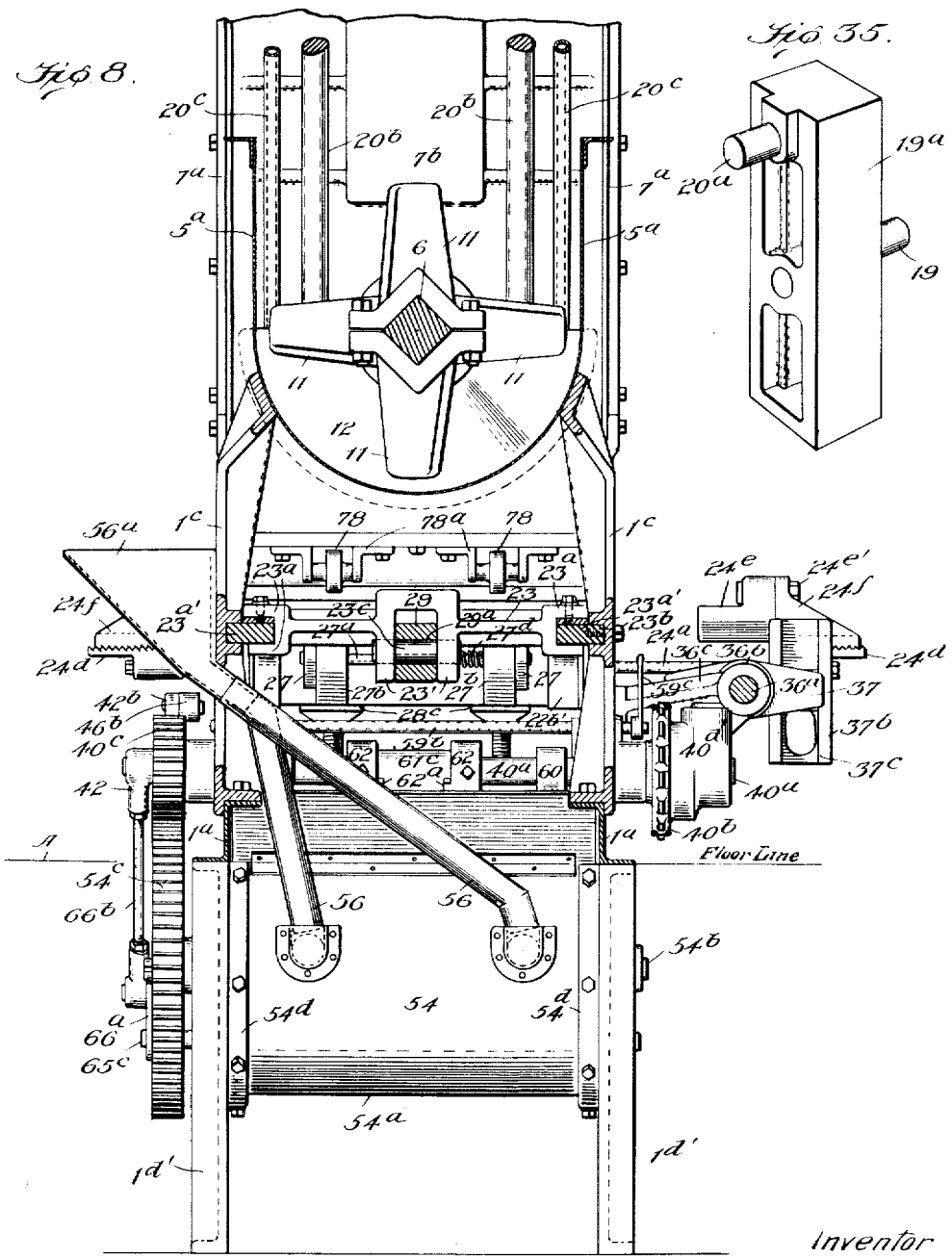

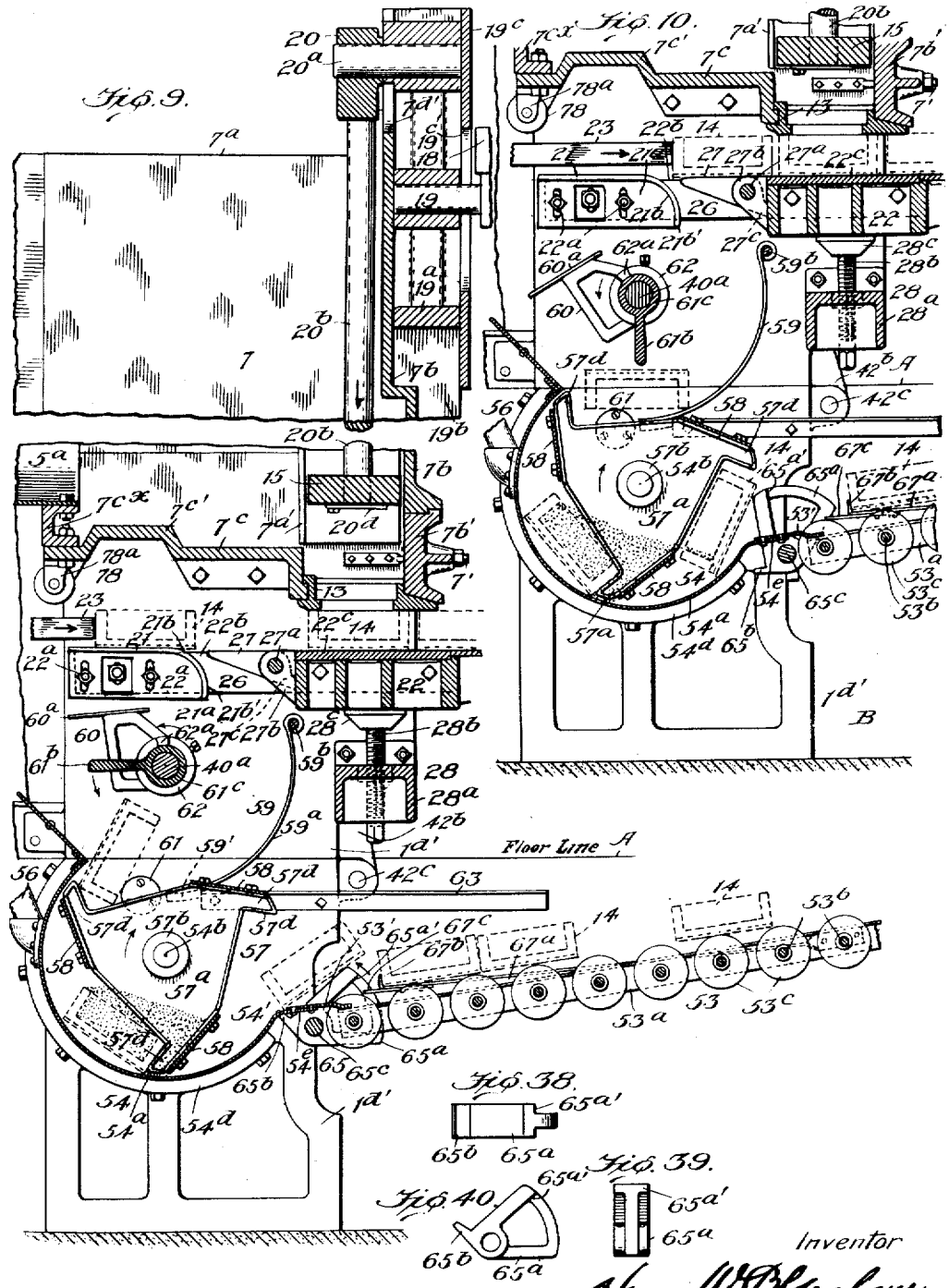

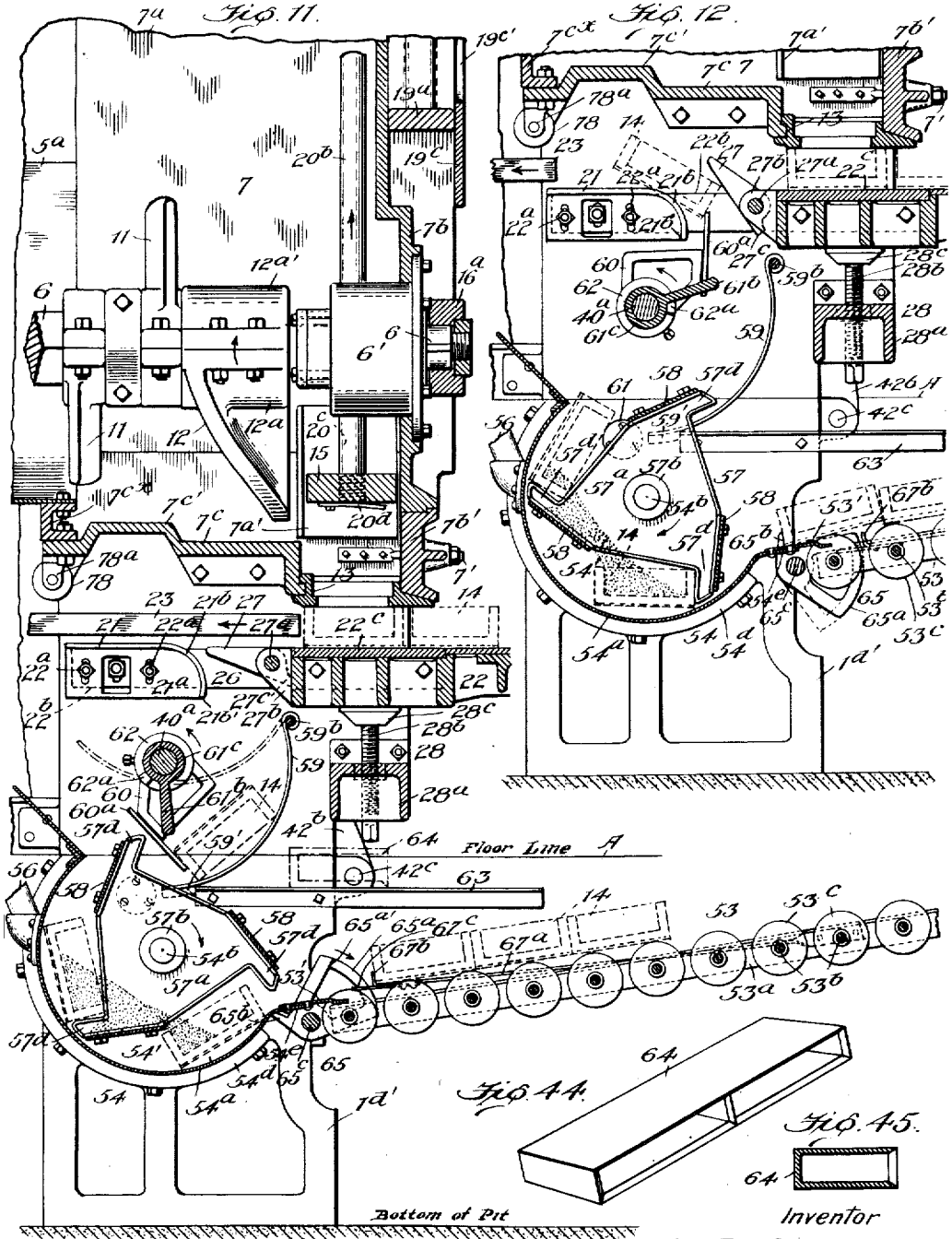

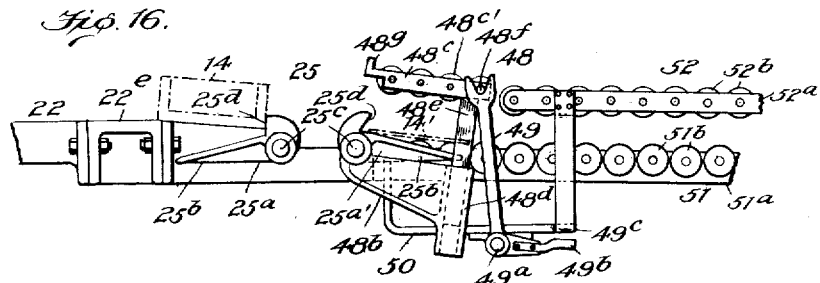
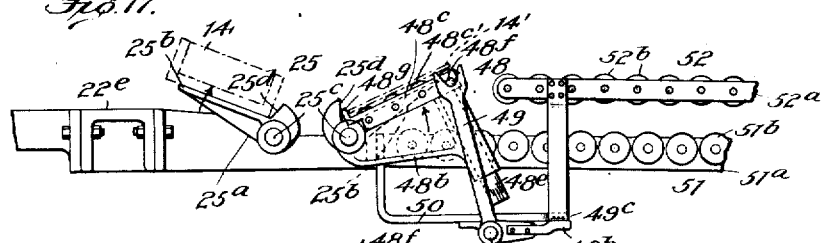
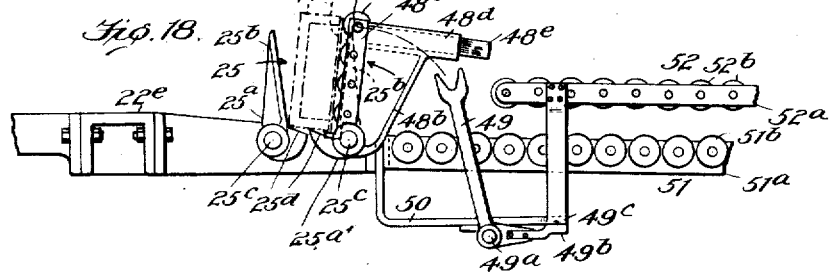
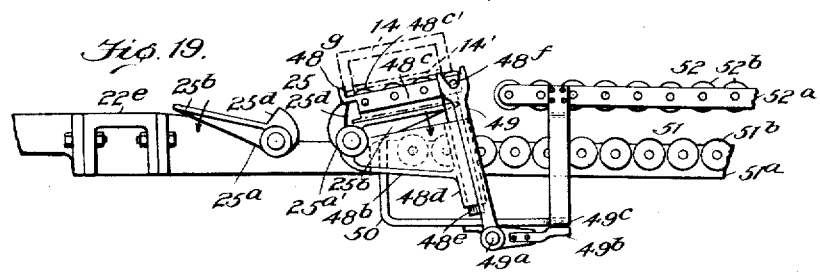
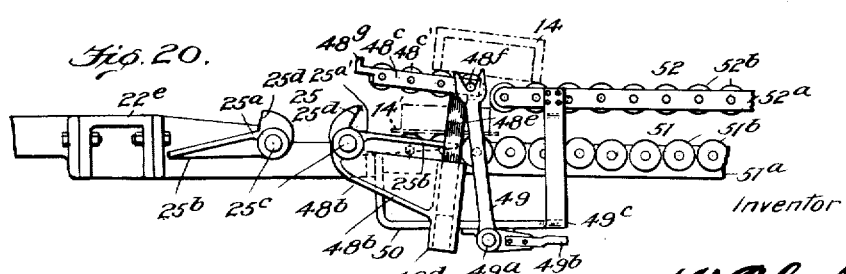

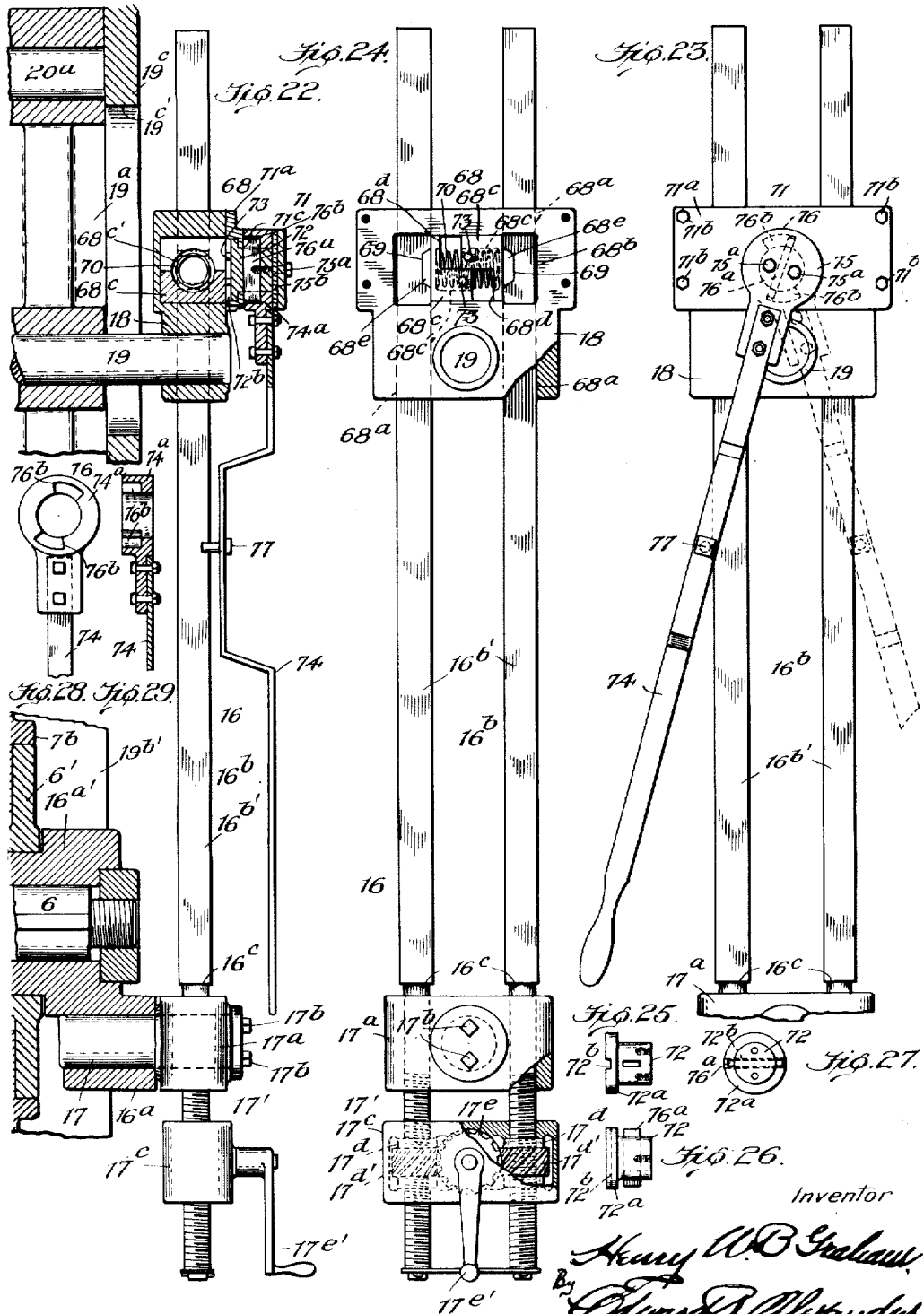

UNITED STATES PATENT OFFICE.

HENRY W. B. GRAHAM, OF NEW LONDON, OHIO, ASSIGNOR TO THE ARNOLD-CREAGER COMPANY, OF NEW LONDON, OHIO, A CORPORATION OF OHIO.

APPARATUS FOR MAKING BRICKS.

1,341,798.     Specification of Letters Patent.     Patented June 1, 1920.

Application filed March 1, 1916. Serial No. 81,425.

*To all whom it may concern:*

Be it known that I, HENRY W. B. GRAHAM, a citizen of the United States, residing at New London, in the county of Huron and State of Ohio, have invented certain new and useful Improvements in and Relating to Apparatus for Making Bricks, of which the following is a specification.

This invention relates to apparatus for molding bricks.

One object of the invention is to provide improved mechanism for molding bricks and handling the molds therefor, whereby the output of the machine is greatly increased and the required manual labor and cost of molding are reduced to a minimum.

Another object of the invention is to provide apparatus of this character in which mechanisms are combined and correlated therewith to successively deliver molds to and from the filling position, and to invert the molds and separate the bricks and molds from each other.

Another object of the invention is to provide improved means for inverting the molds to facilitate separation of the bricks and molds from each other.

Another object of the invention is to provide improved mechanism for separating the molds from the bricks.

Another object of the invention is to provide improved means for inverting, separating and returning the molds to the position for feeding to the filling station.

Another object of the invention is to provide an apparatus of this character having combined and correlated with the filling mechanism, mechanisms for separating the molds from the bricks and sanding the molds, and mechanism for successively moving the molds in a cycle to each of said mechanisms, all of which are arranged in the same vertical plane.

Another object of the invention is to provide an apparatus of this character having combined and correlated in the same vertical plane with the filling mechanism, mechanism for separating the molds from the bricks, mechanism arranged below and rearward of the filling mechanism for sanding the molds, and mechanisms for successively moving the molds in a cycle to each of said mechanisms.

Other objects of the invention will be apparent to those skilled in the art to which my invention relates from the following description taken in connection with the accompanying drawings.

For the purpose of illustration, I have, in the accompanying drawings shown and herein described one form of apparatus embodying my invention.

In the drawings, Figure 1 is a side elevation of a brick making or molding apparatus embodying my invention.

Fig. 2 is a horizontal section of the apparatus on the line 2—2 of Fig. 1.

Fig. 3 is an elevation, enlarged, of the forward part of the apparatus looking from the opposite side from that shown in Fig. 1.

Fig. 4 is a longitudinal section, enlarged, through the forward part of the apparatus showing the mold filling mechanism, mold push-out, bumping mechanism, mold inverting and separating devices, the conveyers for the bricks and empty molds and the sanding mechanism.

Fig. 5 is a section on the line 5—5 of Fig. 4.

Fig. 6 is a section on the line 6—6 of Fig. 4.

Fig. 7 is a fragmentary section, enlarged, on the line 7—7 of Fig. 1.

Fig. 8 is a fragmentary section, enlarged, on the line 8—8 of Fig. 1.

Figs. 9, 10, 11 and 12 are fragmentary sections similar to Fig. 4, but illustrating the operation of the mechanism and devices which sand and move the empty molds from the return conveyer or chute back to the receiver in front of the mold push-out.

Fig. 13 is a detail view, somewhat enlarged, of part of the operating devices for the inverting mechanism.

Figs. 14 and 15 are transverse sections on the lines 14—14 and 15—15, respectively, of Fig. 13.

Figs. 16, 17, 18, 19 and 20 are detail views, enlarged, of the mechanism for inverting the molds and separating them from the bricks.

Fig. 21 is a detail view of one of the guide rollers for the empty molds.

Fig. 22 is an enlarged side view of the crank and pitman and the release devices or safety connections between the pitman and the plunger, and the operating devices therefor, certain of the parts being broken away or in section to facilitate the illustration.

Fig. 23 is a front elevation of the pitman and its release devices or safety connections with the plunger, certain of the parts being omitted and other parts being broken away.

Fig. 24 is a front view of the pitman with the operating devices for the pitman release devices or safety connections omitted.

Figs. 25 to 32, inclusive, are detail views of parts of the release devices and the operating devices therefor between the pitman and the stud-shaft to which it is pivotally connected.

Fig. 33 is a view partly in section on the line 33—33 of Fig. 7.

Fig. 34 is a section on the line 34—34 of Fig. 33.

Fig. 35 is a perspective view of the plunger.

Fig. 36 is a section on the line 36—36 of Fig. 2.

Fig. 37 is a section on the line 37—37 of Fig. 1.

Figs. 38, 39 and 40 are top, end and side views, respectively, of one of the rockers of the mold regulating devices.

Fig. 41 is a top plan view of a mold, part being broken away.

Fig. 42 is a side view, partly in section, of the mold.

Fig. 43 is a fragmentary top plan view, enlarged, of the mold.

Fig. 44 is a perspective view of a scoop adapted to be run through the sanding mechanism.

Fig. 45 is a transverse section of the scoop.

In the drawings, 1 indicates as an entirety the frame work for the apparatus. The frame work 1 preferably comprises a pair of longitudinal sills $1^a$, $1^a$, an upright transverse member $1^b$, upright plates or equivalent members $1^c$, each of which may rest upon and be bolted to an adjacent sill $1^a$, and a supplemental frame $1^{c'}$. By preference, the sills $1^a$, $1^a$, rest upon the flooring A, in which event the latter may be cut away to form a pit B for a purpose to be later described.

2 indicates as an entirety the driving mechanism for the apparatus. The driving mechanism 2 comprises a shaft $2^a$, to which is splined the movable member of a clutch $2^b$. The shaft $2^a$ is mounted in bearings, $2^c$, $2^c$, $2^{c'}$, which may be of any suitable construction, the latter bearing being preferably provided in the frame member $1^b$. $2'$ indicates a pulley loosely mounted on the shaft $2^a$. The pulley $2'$ carries the other member (not shown) of the clutch $2^b$. The pulley is driven by a belt from some suitable source of power; it serves to drive the shaft $2^a$ when the clutch members $2^b$ are connected together. Intermediate its ends, the shaft $2^a$ carries a pinion $2^d$ for a purpose to be later described, and at its forward end the shaft $2^a$ carries a bevel pinion $2^e$, which meshes with and drives a bevel gear $2^f$ fixed to a transverse shaft $2^g$. The shaft $2^g$ is supported at or near its opposite ends in bearings $2^h$, which are provided in arms $2^{g'}$ of base blocks 3. The blocks 3 are rigidly supported on the sills $1^a$, $1^a$, in any suitable manner. At one end, the shaft $2^g$ carries a spur gear $2^{h'}$ and at its opposite end it carries a bevel gear $2^i$. The purpose of these gears will be later described.

The movable member of the clutch $2^b$ has secured to it a collar $2^{b'}$. 4 indicates a lever one end of which is bifurcated and connected to the collar $2^{b'}$. Movement of the lever 4 serves to throw the clutch member in and out, in a well known manner. $4^a$ indicates a set of connected links and rods connected at one end to the opposite end of the lever 4, as shown at $4^b$; the connected links and rods extend to the front end of the apparatus where it is provided with a handle $4^c$, by means of which the operative is enabled to start and stop the apparatus. The set of operating connections $4^a$ preferably extend along one side of the apparatus within convenient reach of the operative so that he can throw the clutch in or out from any point where he happens to be.

5 indicates as an entirety a pug mill. The pug mill 5 comprises a casing $5^a$, preferably of U-shape in cross section, and a shaft 6 which extends through the casing. The casing $5^a$ is preferably supported at its front end by the frame members $1^c$. The rear end of the casing $5^a$ is secured in any suitable manner to and supported by the frame member $1^b$, which may form the rear end wall for the casing. The front end of the casing $5^a$ merges into a charging chamber 7. The charging chamber 7 is preferably formed by side plates $7^a$ and a front plate $7^b$ arranged at right angles thereto. The side plates $7^a$ are preferably secured to the supplemental frame $1^{c'}$ and may assist in supporting the front end of the casing $5^a$, while the front plate $7^b$ is, by preference, bolted in any suitable manner to the front edges of the side plates $7^a$.

The supplemental frame $1^{c'}$ may consist of pairs of upright members $1^d$, $1^{d'}$, which may be connected together, as shown in Fig. 7. The members $1^{d'}$ preferably rest on the bottom of the pit B. The charging chamber 7 is provided with a bottom $7^c$, which by preference is disposed in a substantially horizontal plane slightly below the bottom of the casing $5^a$, and connected thereto by a bar $7^{cx}$.

The pug mill shaft 6 preferably extends entirely through the casing $5^a$ and charging chamber 7 and has bearing at its front end in a bearing box or journal $6'$ (Fig. 11) mounted in a recess formed in the front plate $7^b$. The opposite end of the shaft extends through the frame member $1^b$ and has bearing in an upright hanger 8. That portion of the shaft 6 which is within the pug mill 5 and chamber 7 may be square in cross section. $6^a$ indicates a gear carried by the rear end of the shaft 6, outside the casing $5^a$, and in position to mesh with the pinion $2^d$, whereby said gear and shaft are rotated.

The upright hanger 8 is provided with suitable bearings to receive and support the rear end of the pug mill shaft 6. The hanger 8 is preferably mounted on the sills $1^a$. It is provided with a plate $8^a$ which forms the back wall of a casing 9. The casing 9 incloses the gear $6^a$ and pinion $2^d$ to protect these parts from dust and dirt. The casing 9 is fixed to the plate $8^a$ and also supported by brackets $9^a$ fixed to the transverse member $1^b$.

10 indicates a gland which prevents the escape of material through the opening in the frame $1^b$ for the shaft 6.

11 indicates a series of stirring and propelling members that are fixed to the pug mill shaft 6. These members are spaced relative to each other along said shaft and arranged at different positions angularly thereon, for the purpose of effectively stirring material dumped into the pug mill casing $5^a$ and propelling it toward and into the charging chamber 7.

The stirring, agitating and propelling members 11 may be of any suitable form or construction; and a larger or lesser number may be provided on the shaft 6 as may be found necessary to properly agitate, temper and feed forwardly the material in the pug mill casing $5^a$ according to the amount, kind and condition of the material placed therein.

12 indicates a wiper which is secured to the plug mill shaft 6 at a point rearward of but in close proximity to a press-platen 15 in the charging chamber 7. The wiper is preferably adjustably connected to the shaft 6, so that it can be positioned angularly thereon for effective coöperation with the movement of the press-platen to force the clay into the space therebelow at the proper time. Such adjustment may also be found desirable due to the consistency of the material. The preferred form of connections consists (see Fig. 7) of complementary curved hub members $12^a$, $12^{a\prime}$, the former being formed integrally with the wiper 12 and the latter being adapted to be bolted thereto; complementary bushing members $12^b$, $12^b$, having angled faces for engagement with the shaft 6; and interlocking devices $12^c$ between one of the bushing members and the adjacent complementary curved hub member. The interlocking devices may comprise a lug $12^d$, which may be carried by one of the bushing members, and a recess $12^e$, which receives the lug, formed in the adjacent curved member $12^a$. I have shown four recesses $12^e$ which permit of adjustment of the wiper to one of four positions. The members $12^a$, $12^{a\prime}$, and $12^b$, $12^b$, permit of the adjustment of the wiper a quarter turn on the shaft 6, while the interlocking devices $12^c$ permit of intermediate adjustments.

13 indicates a die which is mounted between the front edge of the bottom $7^c$ and the front plate $7^b$, or a removable section plate $7^{b\prime}$, of the charging chamber 7. The section plate $7^{b\prime}$ is preferably secured in position by a pair of bolts $7^\prime$, the inner ends of which are flattened and secured in any well known manner to the plates $1^d$. The die 13 is preferably of rectangular shape and heavily constructed to withstand the strains to which it is subjected. The lower surfaces or edges of the die 13 are preferably flat in order to engage with the upper surface of each mold, indicated at 14, when positioned for filling. The front lower wall of the die 13 operates to scrape the surplus material from the mold top in a manner well known to those skilled in the art to which my invention relates, as the mold is pushed forwardly after being filled.

In the use herein of the term "mold" I wish to be understood to mean a mold in which one or a plurality of mold sections are provided. In practice, it will be found desirable, for obvious reasons, to provide a plural section mold, such as I have chosen to illustrate in the accompanying drawings —see Figs. 41 and 42. Each mold 14 may be of rectangular shape and comprise a pair of side members $14^a$, and a pair of end members $14^b$ each connected to adjacent ends of the side members $14^a$. $14^c$ indicates a plurality of partitions uniformly spaced from each other and the inner walls of the end members $14^b$ to divide the frame into a plurality of sections $14^{c\prime}$, each of which forms a brick mold. $14^d$ indicates a plurality of bottoms, one for each mold section $14^{c\prime}$. The bottoms $14^d$ are preferably spaced from each other a distance slightly greater than the thickness of each partition so as to provide vents. When the mold sections are being filled, the air therein is forced out through these vents; on the other hand, when the mold 14 is dumped, air has access to the under side of the bricks to prevent a vacuum. The end members $14^b$ for the molds comprise blocks which are preferably of rectangular shape in cross section. The blocks $14^b$ are of a size to provide relatively wide upper and lower surfaces which serve as shoes on which the mold 14 runs or slides through the apparatus, as will be later described. This form of construction is of special advantage in properly supporting and guiding the mold when inverted. The upper surfaces of the blocks $14^b$ are preferably disposed in the plane of the upper edges of the sides $14^c$; but for reasons about to be set forth, the blocks $14^b$ are of less height than the height of the mold, so that their lower surfaces are disposed in a plane slightly above the lower surfaces of the bottoms 14$^d$.

It is my custom to soak the molds in water in order to cause the sand to stick to the walls of the molds when passing through the sander. This water soaking operation causes the end members to swell slightly in size, thus increasing their height. Accordingly, when the end members of the mold were made equal in thickness or height to the height of the side members or body portion of the mold and the latter was moved over the table to a position below the die 13, the table and die would engage with the end members, but as these members had, due to their water soaked condition, become thicker than the body of the mold, they would prevent the die from engaging the body portion of the mold between the end members. As a result a space was formed between the body portion of the mold and the lower surface of the die. When the mold was again moved forward, the scraping edge of the die failed to scrape off the material disposed above the plane of the upper surface of the mold, and hence, due to this space between the upper edge of the mold and the scraping edge of the die, it left on top of the mold a thin layer of material which had to be scraped off by a separate operation.

In my improved construction of mold, the end blocks 14$^b$ being of less height than the body portion of the mold, as already described, cannot, even when water soaked, prevent the engagement of the die 13 with the entire upper surface of the mold between the end blocks 14$^b$; accordingly, when the mold is positioned for filling and filled and is again moved forward, the die will scrape off all material above the upper surface of the mold.

14$^e$ indicates a metallic binding strip extending along the upper edge of each side member 14$^a$, then around the ends of the side members and over the bottoms 14$^d$. 14$^f$ indicates similar strips extending along the upper edges of the partitions 14$^c$. Each end of each strip 14$^f$ is preferably secured to the adjacent strip 14$^e$ by a dove tail joint, as shown in Fig. 43. 14$^g$ indicates a bearing plate mounted on the upper surface of each block 14$^b$. The strips 14$^e$ and 14$^f$ and the plates 14$^g$ may be secured to their respective mold parts in any desired manner.

The press-platen 15 is adapted to force the material through the die 13 into the molds 14. The platen 15 extends substantially across the charging chamber 7, its opposite ends being guided by a pair of angle plates 7$^{a'}$ each fixed in any desired manner to the adjacent side wall 7$^a$.

16 indicates as an entirety the mechanism for reciprocating the press-platen 15. Of this mechanism, 16$^a$ indicates a crank fixed to the front end of the pug mill shaft 6. The crank 16$^a$ is preferably provided with an integral sleeve 16$^{a'}$, surrounding and fixed to the shaft in any desired manner, as shown in Fig. 22. 16$^b$ indicates a pitman connected at its lower end through a wrist pin 17 with the crank 16$^a$ and at its upper end pivotally connected through a block 18 to a projection or shaft 19 of a reciprocating member or plunger 19$^a$ in the manner hereinafter set forth. The pitman 16$^b$ preferably comprises two parallel rods 16$^{b'}$, disposed upon opposite sides of the wrist pin 17 and shaft 19.

The connecting devices 17$'$ between the pitman 16$^b$ and the wrist pin 17 are preferably of a character which permit adjustment of these parts to vary the length of stroke imparted to the reciprocating member 19$^a$ to meet varying conditions. At their lower ends the rods 16$^{b'}$ are reduced to form shoulders 16$^c$. The reduced ends of the pitman rods 16$^{b'}$ extend through openings formed in a block 17$^a$. The block 17$^a$ is carried by the outer end of the wrist pin 17, being preferably secured thereto by cap screws 17$^b$. 17$^c$ indicates an abutment which may be adjustably secured to the reduced portions of the rods 16$^{b'}$. The block 17$^a$ is arranged to strike against the shoulders 16$^c$ in the upward stroke of the crank and against the abutment 17$^c$ in the downward stroke of the crank. By adjusting the abutment 17$^c$ longitudinally of the rods 16$^{b'}$, the length of stroke imparted to the pitman by the crank 16$^a$ can thus be varied as desired. The adjusting devices between the abutment 17$^c$ and the rods 16$^{b'}$ may comprise nuts 17$^d$, which engage screw threads provided on the reduced portions of the rods 16$^{b'}$. Each nut is provided with a spiral 17$^{d'}$ arranged to mesh with a spiral gear 17$^e$. The shaft of the gear 17$^e$ is provided with a crank 17$^{e'}$ by which it may be operated. The reciprocating member 19$^a$ is mounted to slide in guides 19$^b$ which are provided on the front plate 7$^b$. 20 indicates a cross bar or yoke which may be connected to the reciprocating member 19$^a$ by an inwardly projecting shaft or rod 20$^a$. 20$^b$ indicates one or more rods connecting the cross bar 20 with the press-platen 15. I preferably provide two connecting rods 20$^b$ between these parts. The rods 20$^b$ are relatively large and solid, by preference, so as to take the strains and stresses required in apparatus of this character. 20$^c$ indicates one or more pipes extending upwardly from the press-platen 15 and serving as conduits for the ingress and egress of air to and from the charging chamber 7. The lower ends of the pipes 20$^c$ preferably extend through the press-platen 15 and form seats for valves $20^d$. The valves $20^d$ permit air to flow into the charging chamber as the platen rises to preclude the formation of a vacuum therein; on the other hand, when the platen 15 descends the valves $20^d$ permit the air to escape from the charging chamber 7 to avoid its compression therein or the formation of air pockets in the bricks and the blowing of sand from the faces of the mold 14. The valves $20^d$ are positioned normally away from their seats, as shown in Figs. 4 and 11, but when the platen 15 contacts with the material, the latter causes the valves to close. As a result of this operation, the valves $20^d$ are open during the first part of the downward stroke of the platen to let the air escape. The upper ends of the pipes $20^c$ may extend through suitable openings formed in the yoke or cross member 20.

The guides $19^b$ preferably comprise a pair of side members $19^{b\prime}$ which may be formed integrally with and extend laterally from the front face of the front plate $7^b$. $19^c$ indicates a plate which is detachably connected, preferably by bolts $19^x$, to the longitudinal front edges of the side members $19^{b\prime}$ and forms therewith guide walls to slidably support the reciprocating member $19^a$. The plates $19^c$ and $7^b$ are formed with slots $19^{c\prime}$, $7^{d\prime}$; the shaft 19 extends through the slot $19^{c\prime}$, while the shaft $20^a$ extends through the slot $7^{d\prime}$. The shaft 19 and stud $20^a$ move from end to end of the slots $19^{c\prime}$, $7^{d\prime}$, respectively, due to the operation of the plunger $19^a$. From the foregoing description it will be seen that, as the press-platen 15 is operatively connected to and driven by the shaft 6, the wiper will force a charge of material into the space below the press-platen each time the latter rises. By proper angular adjustment of the wiper on the shaft 6, relative to the movement of the platen, it can be caused to coöperate therewith in an effective manner.

21 indicates a receiver onto which the empty molds are successively delivered or positioned ready to be moved forward to the mold filling station, as will be later set forth. The receiver preferably comprises a pair of plates $21^a$ having inwardly extending flanges $21^b$ on which the end blocks $14^b$ of each mold rest. This construction leaves the space below the central portion of the mold open so that loose sand can drop therefrom and not accumulate on the receiver as would be the case if it extended entirely across the apparatus.

22 indicates a base or platform, the rear portion of which is arranged below the charging chamber 7. The base is spaced from the die 13 a sufficient distance to permit the brick molds 14 to be moved thereover and between it and the lower edge of the die 13. The rear portion of the platform 22 is arranged between the supplemental frame members $1^d$. The rear end of the base 22 is preferably provided with a pair of arms $22^b$ which are adjustably and pivotally connected at or near their free ends to the frame members $1^d$ by a plurality of bolts $22^a$. The bolts $22^a$ extend through openings in the arms $22^b$ and the frame members $1^d$. The bolts $22^a$ also project through suitable elongated openings formed in the plates $21^a$ and preferably serve to connect the latter to the arms $22^b$. These connecting bolts permit the front end of the base to be raised and lowered or the entire base to be adjusted vertically. The base preferably comprises a plurality of sections as follows: a section $22^c$ arranged below the die 13 to support each mold 14 at the filling position; a section $22^d$ to support each mold 14 opposite a mold bumping mechanism indicated as an entirety at 24; and a section $22^e$ over which the molds travel to an inverting and separating mechanism indicated as an entirety at 25.

As shown, the receiver 21 is spaced from the rear end of the base 22 to provide a passageway or gap 26 through which the empty molds 14 are successively passed and delivered to the receiver 21. The passageway 26 is normally closed by a gate preferably comprising two spaced arms 27 fixed to a shaft $27^a$ which is loosely mounted in lugs $27^b$ extending rearwardly from the base section $22^c$. Each arm 27 carries a foot $27^c$ which engages with the rear wall of the base section $22^c$ and limits the downward movement of the arms 27. The gate arms 27 are arranged to be swung upwardly by a moving mold 14 (see Fig. 12), whereby the latter may pass through the passageway 26. $27^d$ indicates a spring which is preferably coiled around the shaft $27^a$ for the arms 27. The spring $27^c$ is connected at one end to the shaft $27^a$ while its opposite end is connected to some suitable part of the base section $22^c$, whereby the spring tends to maintain the arms 27 in normal position.

28 indicates as an entirety auxiliary means for supporting, in coöperation with the devices $22^a$, the base or platform 22. The auxiliary supporting means 28 are preferably arranged directly below the die 13 in order to take the thrusts due to the operation of the press-platen 15 in forcing the material into the molds 14. The auxiliary supporting means 28 preferably comprise a U-shaped cross member or beam $28^a$ having flanges at its opposite ends which are secured to the supplemental frame plates $1^d$, a plurality of rods $28^b$ extending through and having screw-threaded connection with nuts fixedly carried by the beam $28^a$ and socket plates $28^c$ interposed between the upper free ends of the rods $28^b$ and the base section $22^c$. The rods $28^b$ are squared at their lower ends to receive a tool, whereby they may be rotated to adjust them up and down and to thereby adjust the platform or base 22. The auxiliary supporting means 28 also permit the base 22 to be dropped to free a mold 14 in the event the latter becomes wedged below the die 13 due to a rock or other obstruction being forced into the mold. The base section 22° preferably comprises a heavy casting to withstand relative high pressure as required in apparatus of this character. The upper surface of the section may be made detachable so as to be replaced by a new plate, it being important to maintain all points of this surface parallel with the lower surface of the die 13 that the molds will exactly fill the space between these parts.

The reciprocating feeder or mold push-out 23 serves to successively move the molds 14 from the mold receiving station 21 to the filling position immediately below the die 13. The feeder 23 may consist of a horizontally arranged plate extending across the space between the opposite inner walls of the frame members 1ᶜ and 1ᵈ. It is preferably provided with a plurality of strengthening ribs between which openings may be formed to make the feeder relatively light. The push-out 23 is provided along its opposite side edges with integral upper and lower guide walls 23ᵃ between which are received inwardly extending guide ribs 23ᵃ′. The guide ribs 23ᵃ′ are preferably secured to the frame plates 1ᶜ by a plurality of bolts 23ᵇ. The ribs 23ᵃ′ serve to support the push-out 23 and to guide it longitudinally in a horizontal plane substantially coincident with the plane of the molds, whereby it will engage therewith and move them forwardly and relative to the die 13. For the purpose of coöperation, the receiver 21 is arranged to receive and support a mold 14 as the push-out 23 is moving rearwardly but after it has passed the receiver 21, so that when the said push-out moves forward, it will engage with and move the mold 14 forwardly the desired distance, preferably to a position in registry with the die 13. In this connection it will be understood that when the push-out 23 engages with and moves a succeeding mold, the latter in turn pushes forward the mold or molds in front of it and thereby imparts step-by-step movement to all of the molds on the base or platform 22 to deliver them first to a position where they may be operated upon by the bumping mechanism 24 and then to the inverting mechanism 25, as will be later set forth.

23′ indicates a pair of spaced lugs preferably formed integral with and depending from the rear end of the push-out 23. 29 indicates a pitman or connecting rod. The front end of the pitman 29 is disposed between the lugs 23′ and is formed with an opening 29ᵃ to receive a pin 23ᶜ. The pin 23ᶜ is supported at its opposite ends in alined openings formed in the lugs 23′, whereby the pitman 29 is pivotally connected to the feeder or push-out 23. The rear end of the connecting rod 29 is pivotally connected to the free end of a crank 30 which in turn is fixed to and revolved by a transverse shaft 31. The connecting rod 29 is preferably formed of a plurality of members 29ᵇ which have right and left hand screw-threaded connection with each other to permit the rod to be lengthened or shortened to vary the stroke of the feeder 23 and thus regulate the positioning of the molds 14 below the die 13.

It will be understood from the construction just described that the shaft 31, the crank 30 and connecting rod 29, operate to reciprocate the feeder or push-out 23 forwardly and rearwardly. The shaft 31 is preferably arranged parallel to the shaft 2ᵍ, it being mounted in suitable bearings 31ᵃ in standards 31ᵇ on the base blocks 3. At one end of the shaft 31 is secured a gear 31ᶜ which meshes with the pinion 2ʰ′. The pinion 2ʰ′ and gear 31ᶜ are proportioned to insure proper speed of the shaft 31 and movement of the feeder 23 in coöperation with the movement of the press-platen 15 and other parts of the apparatus.

32 indicates as an entirety automatic release devices or safety connections interposed between and connecting the shaft 31 and gear 31ᶜ together. The purpose of the devices 32 is to permit movement of the gear 31ᶜ relative to the shaft 31 to prevent breakage of part or parts of the apparatus in the event the pusher 23 is stopped by an obstruction to it or the molds 14 in their forward movement. Of these devices, 32ᵃ indicates a casing fixed to one side of the gear 31ᶜ, concentrically of its axis. At one side the casing is provided with a tubular extension 32ᵇ to form a cylinder 32ᶜ in which is slidably mounted a plunger 33. 34 indicates a spring interposed between the plunger 33 and an adjustable cap 34ᵃ for the outer end of the cylinder 32ᶜ. The spring 34 normally tends to push the plunger 33 in a direction toward the shaft 31. 35 indicates a cylindrical block or collar which is keyed in a well known manner to the shaft 31. At one side the block 35 is provided with a socket 35ᵃ which receives the inner end of the plunger 33. The opposite side walls of the socket 35ᵃ are inclined and the inner end of the plunger 33 is provided with inclined side walls to exactly fit the inclined walls of the socket 35ᵃ. As long as the inner end of the plunger 33 is maintained in the socket 35ᵃ, the gear 31ᶜ and shaft 31 will be connected together, whereby the former will transmit power to the latter; but when the resistance to the rotation of the shaft 31 becomes great enough to overcome the force of the spring 34 acting on the plunger 33, the latter will ride up one of the inclined walls of the socket and turn on the periphery of the block 35 without transmitting power to it. From the foregoing description it will be seen that the devices 32 serve to connect the gear 31$^c$ and shaft 31 together, but in the event the push-out 23 is prevented from reciprocating, due to breakage or clogging of the molds 14, they permit the release or detachment of these parts, so that the shaft 2$^g$ can continue to rotate. The cap 34$^a$ is preferably screw-threaded in the outer end of the cylinder 32$^c$. This construction permits it to be adjusted to increase or decrease the tension of the spring 34 and thereby regulate the conditions under which the plunger 33 will automatically detach itself from the block 35.

The purpose of this construction is to relieve strains upon and prevent breakage in certain of the driving parts of the apparatus. While I have chosen to locate the devices 32 between the gear 31$^c$ and shaft 31, they, or equivalent devices, could be located between other parts of the power transmitting mechanisms.

The bumping devices 24 are arranged between the die 13 and the inverting and separating mechanism 25 and operate to free or loosen the bricks from the mold walls ready for the dumping or separating operation. The bumping devices 24 preferably operate to bump each mold while it is on the section 22$^d$ of the support or base 22. Of these devices, 24$^a$ indicates one or more transverse rods extending through a slide opening or openings 24$^b$ formed in the base or platform section 22$^d$. 24$^c$ indicates a pair of bumpers fixed in any well known manner to the opposite ends of the rod or rods 24$^a$ and arranged in a plane slightly above the platform section 22$^d$ so as to engage each mold 14 as it moves intermittently thereover. Each bumper 24$^c$ preferably comprises a base 24$^d$, a mold engaging member 24$^e$ and an adjustable intermediate member 24$^f$ to which the engaging member 24$^e$ is secured. The intermediate member 24$^f$ is preferably detachably as well as adjustably connected to the base 24$^d$. For this purpose, the intermediate member 24$^f$ is provided with an elongated slot 24$^g$ adapted to receive a bolt 24$^h$ having a clamping nut, which when tightened serves to connect the intermediate member 24$^f$ and base 24$^d$ together. The engaging surfaces between the intermediate member 24$^f$ and base 24$^d$ are preferably provided with parallel interlocking ribs and grooves (see Fig. 7) which prevents relative movement between these parts when clamped together, but permit ready adjustment both longitudinally and transversely of the rods 24$^a$, whereby the proper spacing of the bumpers 24$^c$ relative to each other and longitudinally of the platform section 22$^d$ may be effected. The bumpers 24$^c$ are reciprocated transversely of the platform section 22$^d$ by devices indicated as an entirety at 36. These reciprocating devices 36 preferably comprise a shaft 36$^a$ which may extend longitudinally of the apparatus. The shaft 36$^a$ may be mounted in a plurality of spaced bearings 36$^b$; the bearings 36$^b$ may be supported by brackets 36$^c$ secured to the adjacent side of the frame members 1$^c$, 1$^d$ and sill 1$^a$. At its rear end, the shaft 36$^a$ is provided with a bevel gear 36$^d$ which meshes with the bevel gear 2$^l$. At its front end, the shaft 36$^a$ is provided with a crank arm 37 carrying at its free end a stud-shaft 37' on which may be pivotally mounted a polygonal block 37$^a$. 37$^b$ indicates a frame or box which is fixed to or formed integral with the adjacent bumper base 24$^d$ (see Fig. 33). On its rear side, the frame 37$^b$ is formed with a vertically extending, elongated groove or guide-way 37$^c$ having parallel side walls with which the block 37$^a$ has slidable engagement. When the shaft 36$^a$ is rotated to revolve the crank 37, the block 37$^a$ slides up and down in the groove 37$^c$ as the crank moves from its highest position to its lowest position and back again, but due to the engagement of the block 37$^a$ with the side walls of the groove 37$^c$ during movement of the crank, the frame 37 and bumping mechanism are reciprocated horizontally, being guided by the rods 24$^a$ in the openings 24$^b$. The speed of the shaft 36$^a$ is such as to impart a quick reciprocating movement to the bumpers 24$^c$ in order to bump each mold back and forth between them with considerable force. The effect of this operation is to jar or knock each mold 14 with force sufficient to cause the loosening or freeing of the bricks from the walls thereof, so that when the molds are inverted by the inverting mechanism 25, the bricks will readily separate therefrom without any of their parts sticking to the mold walls, especially in the event the molds 14 have been previously sanded, as will be later set forth.

Each mold engaging member 24$^e$ is preferably pivoted loosely at 24$^{e\prime}$ to the adjacent member 24$^f$, to swing upwardly, as shown in dotted lines in Fig. 4, and its rear wall is inclined or beveled (see dotted lines, Fig. 33). In the event either of the bumping members 24$^e$ happens to be in the path of movement of a mold when the latter is being moved forwardly to the bumping position, the mold will engage the inclined wall of the member 24$^e$ and swing it upwardly without affecting its transverse movement; but as soon as the bumping member has cleared the mold, it will drop into operative position and engage the adjacent end thereof.

The shaft 36ᵃ is preferably provided with two cranks 37 which extend in opposite directions relative to the axis of the shaft. These cranks are formed with a T-groove 37ᶜ to receive the head of the bolt or stud-shaft 37', and permit its movement longitudinally of the groove 37ᶜ to adjust the length of stroke imparted to the bumpers 24ᶜ; or by moving the bolt 37' to the opposite side of the shaft 36ᵃ, to change the direction of such stroke. The bolt 37' may be fixed in its adjusted position by a suitable nut.

Through the adjustment of the bumpers 24ᶜ on the supporting member 24ᵈ and of the bolt or shaft 37' along the cranks 37, either or both, I am enabled to so position the bumpers 24ᶜ in correlation with a mold moving forwardly relative to the base section 22ᵃ, that they will not strike the mold as the latter is positioned between them. These adjustments also permit me to so position and operate the bumping members 24ᵉ that either relatively hard or light blows may be imparted to the molds 14 as conditions may require.

38 indicates a pair of guide devices carried by and arranged at opposite sides of the base 22 between the bumping mechanism 24 and the inverting mechanism 25. The devices 38 converge toward each other and are arranged to be engaged by any mold or molds 14 which get displaced on the base 22, and move it or them inwardly or toward the longitudinal axis of the base 22 for proper delivery thereof to the inverting mechanism 25.

Referring to the inverting and separating mechanism 25, 25ᵃ, 25ᵃ', indicate a pair of swingable members which coöperate to invert each mold 14. The members 25ᵃ, 25ᵃ', are arranged to swing from an open position (see Figs. 1, 2, 3, 4, 5 and 16) to a closed position (see Fig. 18), or toward each other and back again, to invert the mold 14 and dump the bricks therefrom. When in the open position, the member 25ᵃ is adapted to receive the forwardmost mold 14 on the platform 22, as shown in Figs. 4 and 16. Each of the members 25ᵃ, 25ᵃ', preferably comprises a pair of spaced arms 25ᵇ, 25ᵇ, fixed to a transverse rock shaft 25ᶜ. The shafts 25ᶜ are loosely mounted in spaced bearings or knuckles preferably formed integrally with the shoes or extensions thereof constituting part of the base section 22ᵉ. When the swingable member 25ᵃ is in its mold receiving position, the arms 25ᵇ thereof are preferably arranged in a downwardly inclined direction with their free ends disposed below the upper surface of the section 22ᵉ, as shown in Figs. 1, 4 and 16. The arms 25ᵇ are preferably provided with integral abutments or bottom walls 25ᵈ with which the side members 14ᵃ of the molds engage while being turned over to dump the bricks. 39 indicates segmental gears fixed to corresponding ends of the shafts 25ᶜ and meshing with each other to rock the shafts 25ᶜ simultaneously, whereby the members 25ᵃ, 25ᵃ', will be closed and opened, or moved toward and from each other in correlation to effect the inverting operation.

40 indicates as an entirety means for operating the members 25ᵃ, 25ᵃ'. Of these means, 42 indicates a crank pin fixed to a pinion 40ᶜ preferably mounted on one end of a shaft 40ᵃ. The shaft 40ᵃ is mounted in bearings provided in the supplemental frame plates 1ᵈ. The opposite end of the shaft carries a sprocket wheel 40ᵇ, around which and a sprocket 41, fixed to the adjacent end of the shaft 31, extends a chain 40ᵈ to drive the shaft 40ᵃ. 42ᵃ indicates a pitman preferably pivotally connected at one end at 42ˣ to a member 42' which in turn is pivotally connected to the pin 42. The opposite end of the pitman 42ᵃ is pivotally connected to a rocker 42ᵇ, which in turn is pivotally mounted on a stud-shaft or pin 42ᶜ, carried by the adjacent supplemental frame member 1ᵈ'. The pivot of the connection between the pitman 42ᵃ and rocker 42ᵇ preferably extends through a slot 42ᵇ' formed in the rocker and is adjustably secured to the walls of the slot in any desired manner.

46 indicates connecting devices between the rocker 42ᵇ and a crank 46ᵃ fixed in any suitable manner to one of the shafts 25ᶜ. The connecting devices 46 are preferably of a character and properly correlated to provide a period of rest between successive operations of the mold inverting members 25ᵃ, 25ᵃ', so that the mold moving device 23 can move a mold 14 onto the receiving member 25ᵃ while it is at rest or prior to the operation thereof. The connections 46 preferably comprise a rod 46ᵇ pivotally connected at one end in any desired manner to the rocker 42ᵇ. The rod 46ᵇ extends through a telescopic member 46ᶜ and carries at or near its inner end an adjustable collar 47 which may be fixed to the rod 46ᵃ by a set screw 47'. The telescopic member 46ᶜ may comprise a pair of blocks 47ᵃ, 47ᵇ, and a pair of strips 47ᶜ which connect the blocks together. The strips 47ᶜ may form guides for the collar 47. The block 47ᵃ is provided with an opening through which the rod 46ᵇ slides. The inner end of the rod 46ᵇ serves as a thrust member to engage the block 47ᵇ and operate the crank 46ᵃ in the forward movement of the rod. The block 47ᵇ is pivotally connected to the crank 46ᵃ in any suitable manner. Preferably, the crank 46ᵃ is provided with an elongated slot (see Fig. 13), through which the pivot pin of the connection extends, to permit adjustment of the pin toward and from the axis about which the crank swings. 46ᵈ indicates a compression spring preferably coiled around the rod 46ᵇ and interposed between the member 47 and the block 47ᵃ. This spring is arranged to be compressed in the rearward stroke of the connections 46. It permits relative movement between the rod 46ᵇ and telescopic member 46ᶜ after the crank 46ᵃ has been moved to its rearmost position. As the spring 46ᵈ acts upon the member 47ᵃ, it maintains the telescopic member 46ᶜ and crank 46ᵃ in their rearmost position until the rod 46ᵇ in its forward movement engages the block 47ᵇ. This rest period for these parts is of sufficient length to permit the mold push-out 23 to deliver the forward-most mold 14 onto the swingable member 25ᵃ. The operation of the swingable members 25ᵃ, 25ᵃ', may be described as follows: In Figs. 4 and 16 they are shown in position ready to receive a mold 14. Upon the delivery of a mold to the member 25ᵃ (see Fig. 16), both members 25ᵃ, 25ᵃ', are rocked upwardly toward each other (see Fig. 18) and then downwardly or away from each other (see Fig. 19). In the movement upwardly sufficient momentum is imparted to the mold 14 on the member 25ᵃ, so that at the end of the upward movement of the members 25ᵃ, 25ᵃ', the mold is caused to swing over the mid-position between the members on to the member 25ᵃ' (see Fig. 18), by which the mold is carried as the members 25ᵃ, 25ᵃ', return to or toward the normal or open position (see Fig. 20); by this arrangement and operation, the mold is turned over or inverted, so that the bricks therein can fall out by gravity. During the period of rest in the open position of the inverting members 25ᵃ, 25ᵃ', an operative, who stands at one side of the machine, places on the swingable member 25ᵃ' a pallet 14' (see dotted lines in Fig. 16). The pallet 14' moves upwardly with the member 25ᵃ' so that it will be in position to receive the bricks from the mold 14 when the latter is turned over as it swings from the member 25ᵃ on to the member 25ᵃ'. The walls 25ᵈ are preferably shaped and correlated with each other to effect the movement of each mold from the member 25ᵃ, 25ᵃ', even though the speed of the machine is not sufficient to swing the molds by momentum from one member to the other or should the machine be stopped at any time with a mold in the mid-position between these members. Referring particularly to Figs. 16, 17, 18, 19 and 20, it will be seen that the walls 25ᵈ of the member 25ᵃ are arranged at an obtuse angle to the adjacent members 25ᵇ and are of a length slightly less than one-half the height of a mold; whereas the walls 25ᵈ of the member 25ᵃ' are arranged at an acute angle to the adjacent members 25ᵇ and are slightly longer than one-half the height of a mold; accordingly, the free ends of the walls 25ᵈ for the members 25ᵃ' extend beyond a point midway between the axes of the shafts 25ᶜ and their free ends terminate in a plane above the free ends of the walls 25ᵈ for the member 25ᵃ. This form of construction therefore provides for the support of the mold when in mid-position and while it swings or rocks from the member 25ᵃ, to the member 25ᵃ'. As this point of support is rearward of the center of gravity of the mold, the latter will tend to swing or rock forwardly; hence, whether the machine is running at the desired speed or not, or has stopped with a mold in the mid-position, the latter will nevertheless swing or rock over onto the member 25ᵃ'.

48 indicates as an entirety mechanism for separating each mold and the bricks therein from each other as the molds are inverted. These devices are arranged to coöperate with the swingable devices 25ᵃ, 25ᵃ', and they preferably operate at or during the time each mold is inverted and the bricks are dumped, so that the inverting of the brick molds and the separation of the molds from the bricks takes place substantially simultaneously. Of this mechanism, 48ᵃ, 48ᵃ, indicate sets of devices arranged to engage and cause separation of each mold 14 from the bricks as the mold is inverted and the bricks are dumped. The sets of devices 48ᵃ are separated from each other a sufficient distance to engage the mold end members 14ᵇ beyond the opposite ends of the pallets 14'. Each set of devices 48ᵃ comprises an arm or bracket 48ᵇ fixed to the shaft 25ᶜ for the swingable member 25ᵃ' so as to move upwardly and downwardly therewith, a mold separating member 48ᶜ movably mounted on the arm 48ᵇ, and an arrester 49 which is pivotally mounted at 49ᵃ in bearings on an auxiliary frame 50 secured to and depending from the base section 22ᵉ. At its outer end, the arm 48ᵇ is provided with a tubular member or socket 48ᵈ, in which is slidably supported a rod or leg 48ᵉ depending from the adjacent mold separating member 48ᶜ. The axis of the socket 48ᵈ preferably extends in a direction substantially at right angles to the arm 48ᵇ and swingable member 25ᵃ'. The rod 48ᵉ being rigidly connected in any well-known manner with and disposed at right angles to the adjacent mold separating member 48ᶜ, serves to support the latter, and by means of its sliding engagement with the socket 48ᵈ, permits the member 48ᶜ to move relative to the arm 48ᵇ while being maintained parallel with the swingable member 25ᵃ', as will be later described. 48ᶠ indicates a pin extending laterally from the outer side of each mold separating member 48ᶜ.

The pins 48ᶠ are arranged to engage the bifurcated free ends of the arresters 49 in the return movement of the adjacent rock shaft 25ᶜ, whereby the members 48ᶜ will be stopped or arrested (see Fig. 19) and supported in an elevated position, as shown in Fig. 20.

When the mold inverting members 25ᵃ, 25ᵃ′, are in the open position, the mold separating members 48ᶜ are supported by the arresters 49 through the pins 48ᶠ. As these members at all times tend to gravitate, they are supported by the arresters 49 until the arms 48ᵇ pick them up in their upward movement, as shown in Fig. 17, after which the members 48ᶜ move with the arms 48ᵇ. Due to the fact that the sockets 48ᵈ and rods 48ᵉ swing through an arc about the axis of the adjacent shaft 25ᶜ, the pivots 49ᵃ for the arresters permit the mold separating members to accommodate themselves to the path of travel of these parts, prior to the picking up of the separating members 48ᶜ in the upward movement of the arms 48ᵇ. During this movement of the arms 48ᵇ, the arresters 49 swing forwardly from the position shown in Fig. 16 to the position shown in Fig. 17. The arresters 49 will be maintained in this latter position by one or more arms 49ᵇ, which are fixed to or carried by the arresters, engaging a stop or stops 49ᶜ carried by an adjacent part of the auxiliary frame 50. The arms 48ᵇ are preferably constructed and arranged to support the separating members 48ᶜ, after they have picked up the latter, in the plane of the arms 25ᵇ so that each mold 14 and the bricks therein will engage and move with the swingable member 25ᵃ′ as a unit. The pivots 49ᵃ for the arresters 49 preferably comprise a single transverse shaft to provide for simultaneous movement of both arresters. Each mold separating member 48ᶜ is preferably provided at its rear end with a flange or lip 48ᵍ which engages the rear wall of each mold 14 and prevents it from sliding rearwardly as the swingable member 25ᵃ′ returns to open position.

The operation of the mold separating mechanism 48 may be described as follows: Fig. 16 shows the parts in the position they occupy when the swingable members 25ᵃ, 25ᵃ′, are in the open position. After the push-out 23 has caused the delivery of the forward-most mold 14 from the base section 22ᵉ on to the swingable member 25ᵃ, the operating connections 46 swing the members 25ᵃ, 25ᵃ′, upwardly simultaneously to the position shown in Fig. 18 and back again to the position shown in Fig. 20, thus causing the mold 14 to swing from the member 25ᵃ to the member 25ᵃ′ as their direction of motion changes, as has already been described. In the upward movement of the member 25ᵃ′, the arms 48ᵇ pick up and carry with them the separating members 48ᶜ (see Fig. 17), so that the latter will be in position to engage the end blocks 14ᵇ of the mold. In the return movement of the member 25ᵃ′, the mold separating members 48ᶜ move therewith until the pins 48ᶠ are stopped by their engagement with the bifurcated ends of the arresters 49 (see Fig. 19), but as the pallet 14′ is supported solely by the arms 25ᵇ, it and the bricks thereon will continue to move or gravitate with the arms throughout the remaining part of their movement to a substantially horizontal position below that in which the mold 14 has been arrested (see Fig. 20). As a result of this operation, the bricks are entirely separated from the mold, thus permitting the dumped bricks and the mold to be handled or conveyed away independently of each other.

From the foregoing description it will be seen that while separation of each mold and bricks is taking place, the supporting parts for the mold and pallet are maintained in planes parallel to each other and the direction of relative movement between them is at right angles or perpendicular to these planes. With the correlated parts functioning in this manner, the bricks are readily dumped or freed from the mold walls. It will also be seen I provide an improved mechanism which substantially simultaneously inverts a filled brick mold and separates the mold from the brick. While I have herein disclosed one form of construction capable of operating to produce these results, my invention is not limited to such disclosure as the same may be changed and modified and other equivalent elements substituted.

51, 52 indicate receiving devices for the bricks and empty molds, respectively. The inner or receiving ends of the devices 51, 52, are supported by the auxiliary frame 50 in juxtaposition to the outer ends of the members 25ᵃ′, 48ᶜ, respectively, when the former is in the open position. The receiving devices 51, 52, preferably comprise gravity conveyers. The conveyer 51 may extend rearwardly to the base extensions of the section 22ᵉ, alongside of the arms 25ᵇ of the swingable member 25ᵃ′, and in a plane slightly above that occupied by the arms 25ᵇ when they are moved to their open position, whereby the conveyer will intercept the pallet 14′ in the downward movement of the latter, as shown in Fig. 20. The conveyer 51 preferably curves laterally, as shown in Figs. 2 and 5, and leads to a suitable drying room or other place of delivery. The conveyer 51 may consist of spaced bars 51ᵃ, carrying loosely mounted rollers 51ᵇ. The bars 51ᵃ may be connected together by a plurality of connectors 51ᶜ and supported from the floor A by a plurality of standards 51ᵈ.

Each mold separating member 48ᶜ is preferably provided with a series of loosely mounted rollers 48ᶜ' in order that the empty molds may gravitate freely to the conveyer 52. In this connection it will also be noted that the swingable members 25ᵃ, 25ᵃ', when in the open position, are inclined downwardly relative to the plane of the base 22, as has already been described. As a result of this arrangement, the mold separating members 48ᶜ will be disposed in a downwardly inclined position, the effect of which is to cause the empty molds 14 to move quickly therefrom onto the conveyer 52.

The conveyer 52 preferably comprises a pair of parallel side members 52ᵃ, each carrying a series of rollers 52ᵇ, and a transverse member 52ᶜ which connects the front ends of the side members 52ᵃ together. The side members 52ᵃ and transverse member 52ᶜ may be formed from a single bar of metal bent into substantially U-shape. The side members 52ᵃ are spaced from each other a sufficient distance so that the rollers 52ᵇ will be engaged by the mold end blocks 14ᵇ. At the point where the series of rollers terminate, the side members 52ᵃ are bent laterally in opposite directions, as shown at 52ᵈ, to a point beyond the opposite ends of the molds to permit the latter to drop by gravity downwardly from the outer end of the conveyer 52. Any suitable means may be employed for receiving the molds from the conveyer 52, sanding them and feeding them into proper position on the receiver 21 in front of the push-out 23. For the purposes of illustration in the apparatus being described, I have elected to employ a conveyer or chute 53 which receives each empty mold 14, as it drops from or runs off of the conveyer 52. The chute 53 delivers each mold to a sanding mechanism 54, which is preferably arranged below and entirely at the rear of the press-platen 15 and die 13. The front end of the chute 53 preferably rests on the floor A at the front end of the pit B; its rear end may be supported by the supplemental frame plates 1ᵈ' in the manner hereinafter set forth. The chute 53 preferably comprises an inclined gravity conveyer formed of a pair of parallel bars 53ᵃ. The bars 53ᵃ are preferably formed of angle irons, connected together by a plurality of rods 53ᵇ which may form shafts for rollers 53ᶜ over which the empty molds 14 run toward the rear end of the chute.

55, 55, indicate a pair of curved guides which extend from the transverse member 52ᶜ to the front ends of the chute bars 53ᵃ. The guides 55 curve downwardly and rearwardly to the chute 53 to guide the empty molds 14 to the latter. The guides 55 are positioned to coöperate with the conveyer 52 so that they will be engaged by each mold 14 in its downward movement from the conveyer 52 about the time it has made a quarter turn, as shown in Fig. 4, and thereby right the mold as it is guided to the conveyer. As the molds 14 move along the conveyer 52 in an inverted position, this construction and arrangement provides for the delivery of the empty molds to the chute 53 right side up. The guides 55 are preferably connected to the transverse bar or member 52ᶜ, which in turn is supported by a plurality of standards 52ᵉ resting on the floor A.

Of the sanding mechanism 54, 54ᵃ indicates a curved wall. The wall 54ᵃ and the supplemental frame plates 1ᵈ', form the sides, bottom and back of a chamber 54', through which the empty molds 14 are moved to sand them prior to their positioning under the die 13. The chamber 54' is adapted to contain a body of loose sand. The wall 54ᵃ is preferably curved concentric to the axis of a driven shaft 54ᵇ mounted at its opposite ends in suitable bearings provided in the side plates 1ᵈ'. 54ᶜ indicates a gear fixed to one end of the shaft 54ᵇ. The gear 54ᶜ is arranged to mesh with the pinion 40ᶜ, by which it is continuously driven. The inner opposing walls of the frame plates 1ᵈ' are preferably provided with integral curved ribs 54ᵈ which form a support for the curved wall 54ᵃ. The curved guide wall 54ᵃ is preferably bolted to the rib 54ᵈ. The front end of the plate 54ᵃ is bent outwardly to form a support 54ᵉ for the rear end of strips 53ᵈ which connect the bars 53ᵃ to the support 54ᵉ, as shown in Fig. 6. Sand may be supplied to the chamber 54' through one or more pipes 56. The lower ends of the pipes 56 lead to suitable openings formed in the wall 54ᵃ; the upper ends of the pipes 56 are connected to a hopper 56ᵃ, thus forming conduits by means of which the sand holding receptacle or chamber can be filled with new sand from time to time.

57 indicates a plurality of propelling members or arms which are fixed to the shaft 54ᵇ and revolve therewith to move the empty molds through the sand holding receptacle or chamber 54'. The propelling members 57 are preferably arranged in alined pairs and uniformly spaced from each other about the axis of the shaft 54ᵇ. The propelling members 57 are preferably formed of the following instrumentalities: 57ᵃ indicates a pair of webs, each of which is integrally connected to a sleeve 57ᵇ. Each sleeve 57ᵇ is fixed to the shaft 54ᵇ, near one end thereof, by a set screw 57ᶜ and key 57ᶜ'. Each web 57ᵃ is of irregular shape to provide projecting members 57ᵈ, the front walls of which engage with the rear walls of the molds 14 to move them through the chamber 54'. As will be noted from the drawings, each projecting member 57$^d$ on one web 57$^a$ alines with a projecting member on the other web, so that each mold will be maintained parallel to the shaft 54$^b$ while passing through the sand holding chamber 54'. The outer edge of each web 57$^a$ is preferably flanged in opposite directions to form relatively wide surfaces for engagement with the side walls and upper edges of the empty molds 14, as shown in Fig. 7.

58 indicates a plurality of devices secured to and movable with the mold propelling webs 57$^a$. The devices 58 perform three functions, to-wit—(1) they serve to connect the webs 57$^a$ rigidly together; (2) they operate to receive the sand which falls under the influence of gravity from each ascending empty mold being moved up through the sand holding receptacle 54' and then discharge it into the succeeding empty mold passing therethrough (see Figs. 11 and 12); and (3) they serve to scoop up sand in the chamber 54' and discharge it into the succeeding mold. Each sand discharging device 58 preferably comprises a flat plate or blade which extends from the front edge of each mold 14 as it passes through the chamber 54' to a point beyond the upper rear edge of the next mold in front of it, so as to receive the sand therefrom and discharge it into the succeeding mold, thus preventing the sand as it gravitates out of a mold ascending through the chamber 54' from falling to the bottom thereof and insuring complete and perfect sanding of the interior walls of each mold. The plates 58 preferably extend to a point close or adjacent to the curved wall 54$^a$ so that they may scoop up loose sand in the chamber 54$^a$' and discharge it rearwardly into the moving molds. The plates 58 may be detachably secured at their opposite ends in any well-known manner to the rear walls of the projecting members 57$^d$ and adjacent portions of the webs 57$^a$ between the members 57$^d$. The shaft 54$^b$ is preferably formed of two sections, the inner ends of which are spaced from each other, as shown in Fig. 7, for purposes of assembly and disassembly of the sanding mechanism.

From the foregoing description, it will be seen that the mold moving members 57 not only move the empty molds through the sand holding receptacle 54', but serve to fill each mold with sand as it passes therethrough, it being of course understood that it is necessary to sand the inner faces or walls of the molds.

59 indicates a guide which receives the empty molds 14 from the sanding mechanism 54 and guides them up into the passageway 26 and, in coöperation with the nose or depending flanges 21$^{b'}$ of the receiver 21 and gate arms 27, turns the empty molds back into an upright position on the receiver 21. The guide 59 preferably comprises a pair of curved plates 59$^a$, the upper ends of which are arranged in close proximity to the front wall of the passageway 26. The upper ends of the guides 59$^a$ are fixed to a transverse rod or rock shaft 59$^b$ mounted in bearings carried by the side plates 1$^d$. At one end, the shaft 59$^b$ extends out beyond the adjacent side plate 1$^d$ and has fixed to it a handle 59$^c$ by means of which the shaft can be rotated to swing the curved plates 59$^a$ upwardly into the position indicated by dotted lines in Fig. 11, the purpose of which will be later described. The plates 59$^a$ are preferably curved on an arc concentric to the axis of the shaft 40$^a$. When in operative position, the lower ends of the guides 59$^a$ rest upon lugs 59' projecting inwardly from the faces of the plates 1$^{d'}$.

60 indicates a sweeper preferably fixed to and revolved by the shaft 40$^a$. The sweeper 60 preferably comprises a pair of spaced arms 60$^a$ arranged near opposite ends of the shaft 40$^a$, but inside of the frame members 1$^d$. The arms 60$^a$ are arranged to engage each mold 14 as it is delivered by the moving members 57 from the sanding mechanism 54 on to the guide plates 59$^a$ and move it longitudinally of the latter and up through the passageway 26 past the gate 27, on to the receiver 21, and in coöperation with the gate arms 27 insure that the mold will be properly positioned at the receiving station. The flanges 21$^b$ of the receiver 21 curve downwardly at 21$^{b'}$ to form the rear wall of the passageway 26. The sweeper arms 60 are preferably arranged at such position on the shaft 40$^a$, angularly, that they will, in coöperation with the mold moving members 57 and mold push-out 23, engage a mold as it leaves the sand receptacle and deliver it on to the receiver 21.

From the drawings and the foregoing description, it will be understood that the wall 54$^a$ of the sanding mechanism 54, and the guide 59 are constructed and arranged to invert each mold after it leaves the chamber 54', so as to cause the necessary inversion of the molds to substantially free them of excess sand; whereas the sweepers 60 and guide 59 are so correlated than in coöperation with the nose 21$^{b'}$ and gate arms 27 they will deliver the mold right side up on to the receiver 21, as shown in Fig. 12.

I preferably provide means for knocking or jarring each mold as it leaves the sand holding chamber 54' in order that all surplus sand may be caused to disengage itself from the surfaces of the mold. These means preferably comprise a pair of guide rollers 61 loosely mounted on stud-shafts 61$^a$ projecting inwardly from the inner opposing faces of the side plates 1$^{d'}$ (see Fig. 21) and a knocker 61$^b$ under the control of the shaft 40$^a$. The rollers 61 extend inwardly from the inner faces of the plates 1$^d$' far enough to be engaged by the end blocks 14$^b$ of each mold as it emerges from the sand holding chamber 54', and guide it upwardly as shown in Figs. 9 and 12, into position to be hit by the knocker 61$^b$. The knocker 61$^b$ may consist of a sleeve 61$^c$ loosely fitting over the central portion of the shaft 40$^a$ and a radially projecting arm 61$^d$ (see Fig. 7), which is of ponderous character capable of imparting to each mold a relatively heavy blow or knock. 62 indicates a pair of collars which are fixed in any desired manner to the shaft 40$^a$ at opposite sides of the sleeve 61$^c$ to prevent longitudinal movement of the sleeve 61$^c$ relative to the shaft 40$^a$. The collars are preferably recessed to receive the opposite ends of the sleeve 61$^c$ and are provided with inwardly projecting lugs 62$^a$ which engage with the arm 61$^d$ (see Figs. 7 and 12) to rotate the knocker 61$^b$ with the shaft. As the sleeve 61$^c$ of the knocker 61$^b$ is loosely mounted on the shaft 40$^a$, it will be understood that after the lugs 62$^a$ have moved the weighted arm or knocker 61$^b$ around to a point past the vertical, the latter will be free to fall and, under the influence of gravity, will therefore swing about the shaft 40$^a$. In so operating, the knocker 61$^b$ will knock the mold 14 which at that time is being moved upwardly by the propelling members 57 over the guide rollers 61. The force of the blow imparted by the knocker 61$^b$ to the mold 14 will free all surplus sand therefrom and at the same time move the forward end of the mold downwardly about the guide rollers 61 on to the guide plates 59$^a$, as shown in Fig. 10, whereupon it will be engaged by the sweeper 60, as shown in Fig. 11.

63 indicates a pair of guides, preferably comprising angle plates, each fixed to the inner face of a side plate 1$^d$'. These guides lead forwardly in a horizontal plane substantially coincident with the lower end of the guide plates 59$^a$. When it is desired to clean out the sand holding receptacle 54', the guide plates 59$^a$ are swung upwardly to the position indicated by the dotted lines in Fig. 11; the molds will then drop on to the guides 63, on which they will be moved forwardly by the propelling members 57 to a position of access, instead of upwardly on the guide plates 59$^a$. This construction is particularly advantageous when it is desired to remove the sand in the sand box 54'. In that event, the molds 14 are first removed from the machine, either by taking them off of the base 22 or running them through on to the guides 63 from which they may be removed, and thereafter placing on the chute 53 a plurality of boxes or receptacles such as indicated at 64 in Figs. 44 and 45. The boxes 64 being open at their forward ends only, serve to shovel up the sand as they pass through the sand holding chamber 54'. The boxes 64 are substantially of the same exterior dimensions as the molds 14, so that they may freely pass down the chute and through the sanding mechanism 54 on to the guides 63, as shown in dotted lines in Fig. 11. The boxes 64 can be removed from the guides 63 in any suitable manner as they successively move forward thereon.

65 indicates devices which control the delivery of the empty molds from the chute 53 to the sanding mechanism 54. In practical operation it is desirable to use at one time in the apparatus a greater number of molds 14 than is sufficient to make the machine operate to full capacity and at the same time provide for the delivery of an empty mold 14 at the filling position below the die 13, each time the pusher 23 moves forwardly; for this purpose I provide at some point in the cycle of movement of the molds 14 through the apparatus a receiver or holder which will receive and hold a plurality of molds 14 without affecting the step-by-step or continuous operation of the various parts of the apparatus and the successive filling, bumping, inverting, discharging and sanding of the molds. In the event one or more of the molds break, get out of position, obstruct the movement of succeeding molds or affect the operation of any part of the machine, such mold can be immediately removed and the machine will still have a full quota of molds. The chute 53 lends itself admirably for this purpose, it being adapted, on account of its length, to receive the empty molds as they are discharged from the conveyer 52 and to permit a plurality of them to accumulate thereon while the devices 65 regulate and control the discharge of the empty molds from the chute 53 one by one into the sand holding receptacle 54', thereby insuring that the molds 14 will follow one another in regular spaced order and be delivered one by one upon the receiver 21 without crowding.

The control devices 65 preferably comprise a pair of rockers 65$^a$, each having a lip 65$^b$, mounted on a rock shaft 65$^c$, and means, indicated at 66, for rocking the shaft 65$^c$. The rockers 65$^a$ are arranged at the rear end and on opposite sides of the chute 53, the forwardly bent support 54$^e$ of the chamber wall 54$^a$ being cut away to permit the positioning of the rockers close to the outer sides of the chute bars 53$^a$. The rockers 65$^a$ are arranged to move relative to the plane of the chute from the position shown in dotted lines in Fig. 12 to the position shown in Fig. 10. While moving to and from the end of their movement below the chute 53, the rockers permit the forwardmost mold to slide down the chute against the lips 65$^b$ and be positioned at the front edge of the sand box wall 54$^a$ (see Fig. 12). The rockers 65ᵃ are arranged to be oscillated by the shaft 65ᶜ. Each time the latter is actuated in one direction, the lips 65ᵇ are moved to a position below the chute 53, or a plate 53′ provided at its front end, to permit the adjacent mold 14, which has been arrested by the lips 65ᵇ, due to its own weight, to pass or slide into the sand box 54′. This operation of the rock shaft 65ᶜ causes the rear ends of the rockers 65ᵃ to swing upwardly, the effect of which is to move the rear side of the mold 14 with it into the path of movement of a pair of propelling members or arms 57 which coöperate in their movement with the rockers 65ᵃ to engage the empty mold just as the rockers complete their forward movement—see Fig. 10.

The operating means 66 for the rock shaft 65ᶜ preferably comprise a crank arm 66ᵃ fixed to the shaft 65ᶜ at that side of the machine on which the pinion 40ᵉ is mounted, and a pitman 66ᵇ connected at one end to the arm 66ᵃ and at its opposite end pivotally connected to the pin 42 on the pinion 40ᵉ through the crank member 42′. The crank member 42′ serves as a connection between the pin 42 and both pitmen 42ᵃ and 66ᵇ.

67 indicates means for holding the empty molds 14 on the chute 53 during the operation of the control and release devices 65. The holding means 67 are arranged rearward of the control devices 65 and are preferably operated thereby to release the molds. The holding means may consist of two resilient spring plates 67ᵃ which are secured at their outer ends in any preferred manner to the outer sides of the bars 53ᵃ for the chute 53. The plates 67ᵃ are inclined relative to the chute 53, so that their inner or free ends normally project thereabove, as shown in Figs. 3 and 9. Near its free opposite end, each plate 67ᵃ is provided with a stop 67ᵇ with which the mold, next succeeding the one being released by the control devices 65, engages, thereby holding all the succeeding molds 14 on the chute 53 against downward movement. The plates 67ᵃ are provided at their free ends with extensions 67ᶜ which project into the path of movement of shoulders 65ᵃ′ projecting laterally from the rockers 65ᵃ. The shoulders 65ᵃ′ are arranged to engage the extensions 67ᶜ in the return or downward movement of the rockers 65ᵃ and through them move the resilient plates 67ᵃ downwardly to position the free ends of the lips 67ᵇ below the plane of the chute 53. When the spring plates are thus depressed, the molds 14 are free to move down the chute 53 until the then forwardmost mold engages with and is arrested by the lips 65ᵇ at the front ends of the rockers 65ᵃ (see Fig. 12). In the next operation of the rockers 65ᵃ, the spring plates 67ᵃ will be released so that they may swing into normal position to arrest the next rearward mold on the chute 53. The spring plates 67ᵃ extend to a point beyond the rear wall of a mold 14 which may at any time be positioned against the lips 65ᵇ. The purpose of this arrangement is to insure movement of the plates 67ᵃ upwardly into position to stop the next succeeding mold 14 before it passes the stops 67ᵇ.

I prefer to provide safety connections or automatic release devices between the shaft 40ᵃ and the sprocket wheel 40ᵇ. For this purpose, the sprocket is provided with a casing 40ᵈ′ which is preferably formed integral with the sprocket. 40ᵉ indicates a recess extending radially of the casing 40ᵈ′ relative to the axis of the shaft 40ᵃ. This casing forms a guide-way for a plunger 40ᶠ. The inner end of the plunger is provided with a projection 40ᶠ′, the opposite sides of which are inclined toward its free end; the projection 40ᶠ′ fits a recess 40ᵃ′, corresponding in shape and size thereto, formed in the side wall of the shaft 40ᵃ. 40ᵍ indicates a spring, preferably of the coiled type, mounted in the recess 40ᵉ. One end of the spring bears against an adjustable cap 40ʰ having screw-threaded connection with the inner wall of the recess 40ᵉ; the opposite end of the spring bears against the plunger 40ᶠ to yieldingly maintain the projection 40ᶠ′ thereof in the recess 40ᵃ′. The outer face of the cap 40ʰ is provided with a recess to receive a tool by which the cap can be turned or adjusted to increase or decrease the tension of the spring 40ᵍ.

These release devices operate in a manner similarly to the safety devices 32 to permit movement of the sprocket 40ᵇ relative to the shaft 40ᵃ. As the bumping mechanism, the inverting devices, the sanding mechanism and the sweeper 60 are operated through or from the shaft 40ᵃ, it will be seen that, in the event of breakage of any of these parts or clogging of the molds at any point therewith, the resistance to the rotation of the shaft becomes greater than the force of the spring 40ᵍ acting to maintain the plunger projection 40ᶠ′ in the recess 40ᵃ′; this will cause the projection to ride up the inclined walls of the recess and thereafter revolve on the shaft 40ᵃ. This operation will automatically release the sprocket 40ᵇ from the shaft 40ᵃ and thereby obviate breakage of these parts of the apparatus or the power transmitting devices therefor.

68 indicates as an entirety devices which permit the automatic disconnection of the pitman rods 16ᵇ from the plunger 19ᵃ, the purpose of which is to avoid breakage to any of the parts between the pug mill shaft 6 and press-platen 15, should the latter meet with some obstruction or become wedged during the operation of the machine. The devices 68 therefore serve as automatic safety connections in the power transmitting means between the shaft 6 and press-platen 15. Referring to the devices 68, 68ª indicates a pair of elongated guide openings extending through the block 18 and arranged to slidably receive the upper ends of the pitman rods 16$^{b'}$. As shown, the openings 68$^a$ are arranged upon opposite sides of the opening for the stud-shaft 19. 68$^b$ indicates a chamber formed in the upper part of the block 18. At its opposite ends the chamber communicates with or merges into the elongated openings 68$^a$. 68$^c$, 68$^c$, indicate a pair of members slidably mounted in the chamber 68$^b$. Preferably each said slide member 68$^c$ has a portion of its side wall cut away as shown at 68$^d$ (Fig. 31), so that a portion of one member overlaps the other member and has sliding engagement therewith. It will be understood that the side walls of the opening 68$^a$ serve as guides for the slide members 68$^c$. 68$^e$ indicates a projection having upper and lower inclined walls carried by the outer end of each slide member 68$^c$. Each projection 68$^e$ is arranged to extend into and exactly fit a correspondingly shaped recess 69 formed in the inner face of the adjacent pitman rod 16$^{b'}$. The central portions of the slide members 68$^c$ are cut away or otherwise formed with cylindrical recesses 68$^{c'}$ in which is mounted a compression spring 70. The spring 70 engages at its opposite ends with the bottom walls of the recesses 68$^{c'}$ and thereby tends to move the slide members 68$^c$ away from each other. As a result of this operation, the projections 68$^e$ are yieldingly maintained within the recesses 69 formed in the pitman rods 16$^{b'}$. In the event the press-platen 15 meets with some obstruction or becomes wedged, the inclined walls of the recesses 69, acting on the inclined walls of the projections 68$^e$, will cause the slide members 68$^c$ to retract in opposition to the spring 70 and thus disconnect themselves automatically from the pitman rods 16$^{b'}$. However, as the pitman 16$^b$ is connected to the crank 16$^a$, it will continue to move up and down without imparting movement through the block 18 to the slide or plunger 19$^a$ and press-platen 15. It will, of course, be understood that the inclined walls of the recesses 69 and projections 68$^e$ are arranged at the proper angle to permit the automatic release of the pitman rods 16$^{b'}$ from the block 18 and that the spring 70 is of such size and strength as to permit the contraction of the slide members 68$^c$ toward each other when movement of the press-platen 15 in either direction is obstructed by a force of any predetermined amount.

71 indicates devices for positively retracting the slide members 68$^c$ to disconnect the pitman 16$^b$ from the plunger 19$^a$ and press-platen 15. The operating devices 71 are preferably provided as it is sometimes desirable to rotate the pug mill shaft 6 without operating the press-platen. Of these devices, 71$^a$ indicates a plate or cover which preferably forms the front wall of the chamber 68$^b$. The cover 71$^a$ is preferably fixed to the block 18 by a plurality of bolts 71$^b$. 71$^c$ indicates an opening formed in the cover 71$^a$ and serving as a journal or bearing for a rotatable plug or member 72. The plug 72 is provided with a flange 72$^a$ which fits an annular seat surrounding the inner end of the opening 71$^c$. 73 indicates a pair of pins or studs, one for each slide member 68$^c$, projecting from the front faces thereof into a slot or groove 72$^b$ preferably extending diametrically across the inner end of the plug 72. The pins 73 are preferably arranged upon opposite sides of the longitudinal axis of the pitman 16$^b$, when the blocks 68$^c$ are in engagement with the pitman rods 16$^{b'}$, and have loose sliding and pivotal engagement with the opposite side walls of the groove or slot 72$^b$ in the plug 72, so that upon the rotation of the latter in an anti-clockwise direction as viewed in Fig. 24, they and through them the slide members 68$^c$ will be moved toward each other. 74 indicates a hand lever which carries at its inner end a collar 74$^a$ rotatably fitting the outer end of the plug 72. 75 indicates a cap which overlies the collar 74$^a$ and outer end of the plug 72. The cap 75 is secured to the plug 72 by bolts 75$^a$. The cap 75 operates to rotatably secure the lever 74 and collar 74$^a$ on the plug 72. 75$^b$ indicates a washer, preferably formed from leather, interposed between the cap 75 and collar 74$^a$. 76 indicates devices which connect the plug 72 and collar 74$^a$ together, but permit movement of the plug 72 relatively to the collar 74$^a$ in one direction. The devices 76 preferably comprise are shaped recesses 76$^b$ formed in the collar 74$^a$ at opposite sides of its inner wall and a bar or key 76$^a$ which extends through the plug 72 and projects laterally from opposite sides of said plug. The recesses 76$^b$ are arranged so that one end of the key engages one end wall of one recess and the other end of the key engages with the opposite end wall of the other recess. In the event the projections 68$^e$ on the slide members 68$^c$ are forced out of the recesses 69 and retracted, this arrangement and form of construction provides for the rotation of the plug 72 by the pins 73 due to retraction of the slide members 68$^c$, without imparting movement to the hand lever 74. In Fig. 23 I have shown the parts just described in normal position, the hand lever 74 being swung to the left and the other parts arranged for coöperation to permit automatic disconnection of the pitman 16$^b$ from the block 18 due to breakage or some obstruction to the operation of the press-platen 15. Should it be desired to disconnect the pitman from the block 18, to permit the rotation of the pug shaft 6 without reciprocating the plunger 19ª and platen 15, the lever 74 may be swung to the position indicated by the dotted lines in Fig. 23. In effecting this operation, the collar 74ª, through the key 76ª, will rotate the plug 72 which in turn will retract the slide members 68ᶜ. Intermediate its ends, the lever 74 carries a pin or bolt 77 adapted to engage the outer sides of the pitman rods 16ᵇ' and hold the lever in either of its positions. To release the bolt 77 from the adjacent pitman rod 16ᵇ', the lever 74 is sprung outwardly far enough to free the inner end of the bolt therefrom, after which it may be moved to its other position.

The operation of the machine may be described briefly as follows: Starting with an empty mold 14, which is shown in dotted lines in Fig. 9, on the receiver 21, such mold is moved forwardly by the mold pushout 23 to a position immediately below and in registry with the die 13, as shown in Figs. 4 and 11. Thereupon the mold pushout moves rearwardly to engage a succeeding mold. In the next forward movement of the mold push-out 23 the succeeding mold is moved to a position immediately below and in registry with the die 13 and this succeeding mold engages with the first mold and moves it forward a distance equal to the width of a mold. This operation continues until the forward-most mold is delivered to the swingable member 25ª of the inverting mechanism 25, which at this time is open, as shown in Fig. 4. As each mold becomes positioned opposite the bumpers 24ᶜ during its period of rest while the mold push-out is moving rearwardly and forwardly, the bumpers 24ᶜ knock or bump the adjacent mold transversely to cause loosening of the bricks from the adjacent faces or walls of the mold. After the delivery of a mold to the member 25ª, the operating means 40 and connecting devices 46 come into operation and swing the inverting members 25ª, 25ª' upwardly and rearwardly. This operation swings the mold over onto the member 25ª', thereby inverting it and allowing the bricks to move with or be dumped upon the pallet 14'. During the return movement of the mold inverting member 25ª' to its open position, the arresters 49 are engaged by the separating members 48ᶜ and they in turn separate the mold from the brick, without affecting the movement of the swingable member 25ª' or the bricks thereon. The bricks and the pallet on which they are supported therefore continue moving with the swingable member 25ª' to a plane below the mold 14. The pallet 14' and the bricks thereon then move onto the conveyer 51, which leads to a drying room or other suitable place of delivery, while the empty mold 14 moves forwardly onto the conveyer 52. From the forward end of the conveyer 52 the mold drops downwardly onto the chute 53. In dropping over the front edge of the conveyer 52 it makes a semi-revolution, whereby it is delivered to the chute 53 in an upright position. The mold 14 moves along the chute, due to its inclination, until the mold is arrested by the lips 65ᵇ of the regulating and control rockers 65ª. At the proper time and in correlation with the propelling members 57 of the sanding mechanism 54, the rockers 65ª rock or swing upwardly, thereby releasing the mold 14 and moving its rear side upwardly into the path of travel of the propelling members 57. The propelling members then engage and move or slide the mold around the curved wall 54ª of the sanding mechanism 54, during which time the mold is sanded. As the mold emerges from the upper end of the sand holding chamber 54' it is knocked by the knocker 61ᵇ to free the mold of excess or surplus sand and to throw its front end downwardly into engagement with the guides 59ª. Immediately following this operation the sweeper or thrust devices 60 engage the rear side of the mold and move it upwardly through the passageway 26 onto the receiver 21. The mold push-out will then engage the mold and move it forwardly to the filling position below the die 13.

In order to limit the upward and rearward movement of the mold 14 as it is moved upwardly by the thrust devices 60 through the gate 26, I preferably provide one or more stop devices 78 at the rear end of the bottom 7ᶜ for the charging chamber 7. These stop devices 78 are arranged to stop the rearward movement of the mold 14 so that it will at all times be positioned on the receiver 21 in front of the mold push-out 23. In order that the mold may be unobstructed in its movement through the passageway 26 and onto the receiver 21, the bottom 7ᶜ of the charging chamber is preferably elevated or offset as shown at 7ᶜ'. The stop devices 78 preferably comprise a pair of rollers loosely mounted in bearings provided in the free ends of brackets 78ª depending from the charging chamber bottom 7ᶜ.

It will be noted that each of the molds is a closed bottom mold, that is, it has side and end walls and a bottom wall. The surface of each of these walls which is to be engaged by the clay or mud must be coated or suitably sanded to assist in the separation of the bricks in perfect condition from the molds. In order to properly sand the molds, I cause each mold to enter the sand box with its open side uppermost, so that the sand may enter the mold cavities and engage the inner surfaces of the sides, bottom and ends thereof; then, in order to get the surplus sand out of the mold cavities, I find it desirable to invert the mold so as to dump out the sand and cause the surplus sand to fall back into the sand box. Having inverted the mold for this purpose, in order to locate it properly on the receiver 21 with its open side uppermost, I must return it from inverted position above the sand box to upright position on the receiver 21. This I do by causing the mold to be projected substantially vertically upwardly until it engages the pivoted gate 27 which, in coöperation with the downwardly extending flanges 21$^{b'}$ on the receiver 21 serves to direct the mold on to the receiver 21 with its open side uppermost. That is, it will be noted that the path of travel of the mold through the sand box and on to the receiver 21 is that of the character S. The mold starts with its open side uppermost, is inverted and then turned back again so that its open side is uppermost when the mold lands on the receiver 21. This path of travel for the mold through the sanding mechanism, and onto the receiver 21 is located entirely in the rear of the filling mechanism and press box and is in the plane of the receiver.

A machine of my improved construction is peculiarly adapted for making what are ordinarily known as soft mud bricks, and the construction of my mechanism is such that the mud may be worked relatively stiff, which is of great advantage in the handling and drying of the bricks, among other things as is well known to those skilled in the art.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

No claim is made herein to the disclosed subjects-matter relating to (1) the mold, (2) the bumping mechanism, and (3) the safety connections between the pitman and press-platen, the inventions therein being claimed by me in divisional applications filed October 27, 1916, Serial No. 127,981, April 15, 1918, Serial No. 228,640½ and April 15, 1918, Serial No. 228,641½, respectively.

What I claim is:

1. In apparatus of the class described, the combination with means for filling molds with material for making bricks, of means for inverting each mold and substantially simultaneously separating the mold from the bricks, and means for successively feeding molds to a position for filling and then to said inverting means.

2. In apparatus of the class described, the combination with means for filling molds with material for making bricks, of mechanism for successively handling in a cycle a series of molds and feeding them to said filling means, including means for substantially simultaneously inverting each mold and separating the mold from the bricks.

3. In apparatus of the class described, the combination with means for filling molds with material, of devices for inverting each mold, said devices being adapted to receive a pallet for each mold, means, one element of which is carried by the inverting devices, for separating the molds from the bricks, and means for feeding molds to the filling means and then to the inverting devices.

4. In apparatus of the class described, the combination of means for filling molds with material, means including a pair of members swingable toward and from each other for substantially simultaneously inverting each mold and separating it from the bricks, and means for moving the molds successively to said filling means and then to said inverting and separating means.

5. In apparatus of the class described, the combination of means for filling molds with material, a pair of members swingable from a substantially horizontal position to a substantially vertical position and back again for inverting the molds to dump the bricks therefrom, connections between said members to cause them to move together, and means for successively moving the molds to said filling means and then to one of said swingable members.

6. In apparatus of the class described, the combination of a pair of members swingable from a substantially horizontal position to a substantially vertical position and back again for receiving and inverting a brick mold to dump the bricks therefrom, coöperating devices between said members serving to support the mold as it is being inverted, and means for delivering the mold to one of said swingable members.

7. In apparatus of the class described, the combination of a pair of members swingable from a substantially horizontal position to a substantially vertical position and back again for receiving and inverting a mold to dump the bricks therefrom, means carried by each of said swingable members serving to support the mold as it moves from one of said members to the other, and means for delivering the mold to one of said swingable members.

8. In apparatus of the class described, the combination of a pair of members swingable from a substantially horizontal position to a substantially vertical position and back again for receiving and inverting a mold to dump the bricks therefrom, means for delivering the mold to one of said swingable members, and a device carried by the other member arranged to engage and support each mold at a point beyond its center of gravity, whereby the mold will rock from one member to the other about said point of support.

9. In apparatus of the class described, the combination of a pair of mold receiving and discharging members swingable from a substantially horizontal position to a substantially vertical position and back again for receiving and inverting a mold, and devices carried by each of said members and arranged to support the mold as it is inverted, the device carried by said receiving member extending at an obtuse angle thereto and the device carried by the discharging member extending at an acute angle thereto and arranged to engage the mold at a point beyond its center of gravity to cause it to rock from the receiving member to the discharging member when said members are in substantially vertical position.

10. In apparatus of the class described, mechanism for substantially simultaneously inverting a brick mold and separating the mold from the bricks.

11. In apparatus of the class described, mechanism including a pair of members swingable simultaneously toward each other and then away from each other for substantially simultaneously inverting a mold and separating the mold from the bricks.

12. In apparatus of the class described, the combination of means for filling molds with material, means including a pair of members swingable toward and from each other for substantially simultaneously inverting each mold and separating the mold from the bricks, and devices for maintaining the supporting elements for the molds and bricks parallel to each other during separation of the molds from the bricks, and means for successively moving the molds to said filling means and then to said inverting and separating means.

13. In apparatus of the class described, mechanism arranged to receive a filled brick mold and substantially simultaneously invert the mold and separate the mold from the bricks and deliver or discharge the mold and bricks at different positions.

14. In apparatus of the class described, the combination of mechanism including a pair of members swingable simultaneously toward each other and then away from each other for inverting a brick mold, means for separating the mold from the bricks, and means for operating said swingable members, said operating means operating to maintain said swingable members in a state of rest while a mold is being positioned on one of them.

15. In apparatus of the class described, the combination of a swingable mold receiving member, a swingable member coöperable with said receiving member, means for simultaneously swinging said members toward each other and then away from each other, whereby the mold is inverted, means for delivering a filled mold to said mold receiving member, and means, including an element swingable with and movable relative to one of said members while the mold is being inverted, for separating the mold from the bricks.

16. In apparatus of the class described, the combination of a swingable mold receiving member, a swingable discharge member, means for swinging said members toward each other and then away from each other, whereby the mold is inverted, means for delivering a filled mold to said mold receiving member, and means including an element swingable with and movable relative to one of said members while the mold is being inverted for separating the mold from the bricks, and devices for maintaining said element parallel to said member as it moves relative thereto.

17. In apparatus of the class described, the combination of a swingable element arranged to receive a filled brick mold, a pair of members swingable about a common axis, one of said members being arranged to receive and support a pallet and the other of said members being arranged to be engaged by the mold and to move with and also relative to said pallet receiving member, means for operating said mold receiving element and said pallet receiving member to position the mold and bricks on said members, and means for causing relative movement between said members during movement of the pallet receiving member to separate the mold from the bricks.

18. In apparatus of the class described, the combination of a swingable mold receiving member, a swingable brick discharge member adapted to receive a pallet on which the bricks are dumped, means for swinging said members toward each other and then away from each other, whereby the mold is inverted, and devices coöperating with said discharge member while the mold is being inverted for separating the mold from the bricks.

19. In apparatus of the class described, the combination of a swingable mold receiving member, means for moving brick molds to said swingable mold receiving member, successively, a swingable discharge member arranged to receive a pallet to support the bricks dumped from a mold, means for moving said swingable members toward and from each other, whereby each mold delivered to the receiving member is swung over onto said discharge member and inverted, a pair of devices movable with said discharge member and arranged to engage each mold as it is delivered to said discharge member, and means for arresting the said devices in the downward movement of said discharge member, whereby the mold is separated from the bricks and the bricks are positioned on the pallet.

20. In apparatus of the class described, the combination of a swingable receiving member, means for moving brick molding devices onto said swingable receiving member, successively, a swingable discharge member adapted to receive a brick supporting device on which the bricks are dumped from a molding device, means for actuating said members to cause them to swing toward and from each other, whereby each molding device delivered to the receiving member is swung over onto said discharge member and inverted, a pair of elements movable with said discharge member and arranged to be engaged by a molding device as it is delivered to said discharge member, means for arresting said elements in the return movement of said discharge member, whereby the molding device is separated from the bricks and the bricks are positioned on said supporting device, and means for conveying away one of said devices.

21. In apparatus of the class described, the combination of a support, a pair of receiving devices arranged in different horizontal planes, mechanism interposed between the discharge end of said support and said receiving devices and constructed and arranged to receive a filled brick mold and substantially simultaneously invert the mold and separate the mold from the bricks and deliver the empty mold to one of said receiving devices and the bricks to the other of said receiving devices, and means for moving a mold on said support to said mechanism.

22. In apparatus of the class described, the combination of a support along which brick molds are moved step by step, a pair of conveyers arranged in the same vertical plane with said support, mechanism interposed between the discharge end of said support and said conveyers and constructed and arranged to receive a filled brick mold, invert the mold and separate the mold from the bricks, and deliver the empty mold to one of said conveyers and the bricks to the other of said conveyers, and means for moving a mold along said support to said mechanism.

23. In apparatus of the character described, the combination of a pair of swingable members, one of which is arranged to receive a mold filled with bricks, means for delivering a filled mold to the swingable receiving member, means for swinging said members upwardly or toward each other and downwardly or away from each other simultaneously to swing the mold from the receiving member onto the other member and invert it, and means for separating the molds from the bricks.

24. In apparatus of the character described, the combination of a pair of swingable members, one of which is arranged to receive a mold filled with bricks, devices for delivering a filled mold to the swingable receiving member, means for swinging said members simultaneously toward and from each other to swing the mold from the receiving member onto the other member and invert it, and means for separating the mold from the bricks, said swinging means including a compression spring interposed between elements thereof.

25. In apparatus of the character described, the combination of a pivoted member arranged to receive a mold filled with bricks, a separate pivoted member arranged to receive a pallet, means for swinging said members toward each other and away from each other, simultaneously, said receiving member operating to swing the mold over onto the other member, whereby the mold is inverted, and means coöperating with said pallet receiving member to separate the mold from the bricks.

26. In apparatus of the class described, the combination of a support, means for filling brick molds with material, mechanism for separating the molds from the bricks, means for moving molds over said support to said filling means and then to said separating mechanism, a conveyer element arranged below said separating mechanism and arranged to receive the empty molds, means for delivering empty molds to said conveyer element in upright position, and means for returning the molds from said conveyer element to said support.

27. In apparatus of the class described, the combination of a receiver, means arranged in front of said receiver for filling brick molds with material, means for dumping the molds, means for successively feeding molds from said receiver to a position to be filled by said filling means and then to said dumping means, means arranged in the same vertical plane but below and rearward of said filling means for sanding the empty molds, a guide extending from said sanding means for guiding the empty molds around the front end of said receiver, and means for moving the molds along said guide to said receiver.

28. In apparatus of the class described, the combination with a support, of a receiver rearward of and spaced from said support to form a delivery gap between them, means for filling brick molds with material, means for successively feeding molds from said receiver to a position on said support for filling, means arranged below said filling means for sanding the empty molds, and means for moving the molds from said sanding means upwardly through the delivery gap on to said receiver.

29. In apparatus of the class described, the combination with a support, of a receiver rearward of and spaced from said support to form a delivery gap between them, means for filling brick molds with material, means for successively feeding molds from said receiver to a position on said support for filling, means arranged below said filling means for sanding the empty molds, and means for moving the molds from said sanding means upwardly through the delivery gap on to said receiver, said receiver being provided at its front end with a depending guide member.

30. In apparatus of the class described, the combination with a support, of a receiver rearward of and spaced from said support to form a delivery gap between them, means for filling brick molds with material, means for successively feeding molds from said receiver to a position on said support for filling, means arranged below said filling means for sanding the empty molds, means for moving the molds from said sanding means upwardly through the delivery gap on to said receiver, and a pivoted gate for the delivery gap.

31. In apparatus of the class described, the combination with a support, of a receiver rearward of and spaced from said support to form a delivery gap between them, means for filling brick molds with material, means for successively feeding molds from said receiver to a position on said support for filling, means arranged below said receiver for moving the molds upwardly through the delivery gap onto said receiver, and a pivoted gate for the delivery gap, said receiver being provided at its front end with a depending member with which said gate coöperates to right the mold as it moves through the delivery gap.

32. In apparatus of the class described, the combination with a support, of a receiver rearward of said support, means for filling brick molds with material, means for successively feeding molds from said receiver to a position on said support for filling, means arranged in the same vertical plane below and rearward of said filling means for sanding the molds, a guide leading to said receiver from said sanding means and coöperating with the latter to invert the sanded molds, and means for moving the molds from said sanding means along the guide to said receiver.

33. In apparatus of the class described, the combination with a support, of a receiver arranged rearward of said support, means for filling brick molds with material, means for moving the molds from said receiver to a position on said support for filling, a sanding mechanism arranged below and in the vertical plane of said receiver, a guide between said receiver and said sanding mechanism and coöperating with the latter to invert the sanded molds, a revoluble element for moving the molds from said sanding mechanism to said receiver, and a swingable member arranged to be moved into operative position by said revoluble element for knocking each mold as it moves on to said guide.

34. In apparatus of the class described, the combination of a brick mold receiver, means for filling the molds with material, means for dumping the brick molds, means for feeding molds from said receiver to said filling means and then to said dumping means, a sand holding chamber arranged in the same vertical plane but below and rearward of said filling means, means for conveying the empty molds to and through said chamber, and means between said chamber and said receiver for returning the molds to the latter for actuation by said feeding means.

35. In apparatus of the class described, the combination with means for filling molds with material, of means for successively feeding molds to a position to be filled by said filling means, means for sanding the empty molds, a shaft, a knocker loosely mounted to rotate on said shaft, and means arranged to rotate the knocker on said shaft to a position to one side of the vertical, whereby it will swing about said shaft to knock a mold and free the loose sand therefrom.

36. In apparatus of the class described, the combination with means for filling molds with material, of means for dumping the molds, means for successively feeding molds to a position to be filled by said filling means and then to said dumping means, means for sanding the empty molds, means for returning the molds from the sanding means to a position for engagement by said feeding means, and means for knocking the molds after they have been sanded to free all loose sand therefrom, said knocking means being arranged to position the mold for engagement by said return means.

37. In apparatus of the class described, the combination with means for filling molds with material, of means for dumping the molds, means for successively feeding molds to said filling means and then to said dumping means, means for sanding the empty molds, means for returning the molds to said feeding means, said return means including a guide device, means for directing the empty molds in a direction at an angle to said guide device, and means for knocking each mold as it is guided by said directing means and for moving it onto said guide device.

38. In apparatus of the class described, the combination of a receiver, means for filling molds with material, means for successively feeding molds from said receiver to said filling means, means for sanding the empty molds, a guide device leading from said sanding means to said receiver, a pair of rollers arranged to guide the empty molds in a direction at an angle to said guide devices, and means for moving the molds along said guide device to said receiver.

39. In apparatus of the class described, the combination of means for filling brick molds with material, means for dumping the brick molds, means for moving molds to said filling means and then to said dumping means, a sand holding chamber arranged in the same vertical plane but below and rearward of said filling means, means for conveying the empty molds to said chamber, means for moving the molds through said chamber, and means for knocking each mold after passing through said chamber.

40. In apparatus of the character described, the combination of means for moving, conveying and supporting a series of molds through a cycle, means for filling each mold with material when moved to a predetermined position, mechanism arranged at another point in the cycle of movement of said molds for dumping them, mechanism arranged at a farther point in the cycle of movement of said molds for sanding them, and a device arranged at a farther point in the cycle of movement of the molds for knocking them to free them of all loose sand.

41. In apparatus of the class described, the combination of means for filling brick molds with material, means for successively feeding molds to said filling means, devices for returning the empty molds to a position for engagement and operation by said feeding means, said devices including a chute arranged to receive empty molds, and mechanism for regulating the movement of the molds one by one from said chute to said return devices.

42. In apparatus of the class described, the combination with means for filling molds with material, of means for separating the molds, means for successively feeding molds to said filling means and then to said separating means, devices for returning the empty molds to a position for engagement and operation by said feeding means, and mechanism between said separating means and said feeding means for regulating the movement of the molds during their return to the latter means by said return devices.

43. In apparatus of the class described, the combination with means for filling molds with material for making bricks, of dumping means for the molds, mechanism for successively feeding the molds to said filling means and then to said dumping means, a chute adapted to receive the empty molds from said dumping means, devices for returning the empty molds from said chute to a position for actuation by said feeding means, and a rocker for regulating the discharge of the molds from the chute to said return devices.

44. In apparatus of the class described, the combination with means for filling molds with material, of means for dumping the molds, means for feeding molds successively to said filling means and then to said dumping means, a chute arranged to receive empty molds after they have been dumped by said dumping means, devices for returning the empty molds from said chute to a position for engagement and operation by said feeding means, and mechanism for regulating the movement of the molds from said chute to said return devices, said mechanism comprising a rocker having a lip with which each mold engages and means for oscillating said rocker to permit each mold to pass over said lip.

45. In apparatus of the class described, the combination of means for filling molds with material for making brick, mechanism for successively feeding molds to said filling means, devices for returning the empty molds to a position for actuation by said feeding means, said devices including a chute, means for regulating the delivery of the molds from said chute, and means for holding the molds against movement on the chute while said regulating means is operating to deliver a mold.

46. In apparatus of the class described, the combination of means for filling molds with material, mechanism for successively feeding molds to said filling means, devices for returning the empty molds to a position for actuation by said feeding means, said devices including a conveyer element, means for regulating the delivery of the molds from said conveyer element, and means controlled by said regulating means for holding the molds against movement on said conveyer element while said regulating means is operating to deliver a mold.

47. In apparatus of the character described, the combination of means for moving and supporting a plurality of unattached brick molds through a cycle, means for filling each mold with material when moved to a predetermined position, mechanism arranged at another point in the cycle of movement of said molds for separating the molds from the bricks, and mechanism arranged at a further point in the cycle of movement of said molds for sanding them ready for filling said moving and supporting means, said filling means and said separating and sanding mechanisms being arranged in the same vertical plane.

48. In apparatus of the class described, the combination of means for filling molds with material, means for dumping the brick molds, means for moving molds to said filling means and then to said dumping means, a chamber arranged in the same vertical plane but below and rearward of said filling means for holding sand, means for conveying the empty molds to said chamber, and means for moving the molds through said chamber.

49. In apparatus of the class described, the combination with a brick machine having a filling station, of supporting means for empty molds arranged rearward of said filling station, elements of said supporting means being movable to form an opening or delivery gap through which the empty molds move, and means for moving the empty molds upwardly through said gap onto said supporting means.

50. In apparatus of the class described, the combination with a brick machine having a filling station, of supporting means for empty molds arranged rearward of said filling station, elements of said supporting means being swingable in a vertical plane to form an opening or delivery gap through which the empty molds move, and means for moving the empty molds upwardly through said gap onto said supporting means.

51. In apparatus of the class described, the combination with a station for filling brick molds, of supporting means for empty molds arranged rearward of said filling station, elements of said supporting means being movable to form an opening or delivery gap, mechanism for separating each mold from the bricks, means for conveying each empty mold from said separating mechanism rearward in the plane of but below said separating mechanism and said filling station and then upwardly through the opening or delivery gap onto said supporting means, and means for successively feeding the molds from said supporting means to said filling station and then to said separating mechanism.

52. In apparatus of the class described, the combination of a support formed with an opening therein, means arranged in front of the opening for filling molds with material, mechanism for dumping each mold, means for conveying each empty mold from said dumping mechanism rearward in the plane of but below said dumping mechanism and said filling means and then upwardly through said opening to position them on said support, means for successively feeding the molds from the position to which they are delivered on said support to said filling means and then to said dumping mechanism, and a pivoted element normally closing the opening formed in said support over which the molds pass as they are moved forward by the said feeding means.

53. In apparatus of the class described, the combination with a station for filling brick molds, of supporting means for empty molds arranged rearward of said filling station, elements of said supporting means being movable to form an opening or delivery gap, mechanism for separating each mold from the bricks, means for conveying each empty mold from said separating mechanism rearward in the plane of but below said separating mechanism and said filling station and then upwardly through the opening or delivery gap to position the mold on said supporting means, sanding mechanism arranged below said filling station and in the path of movement of the molds for sanding them as they are moved to said supporting means, and means for successively moving the molds from said supporting means to said filling station and then to said separating mechanism.

54. In apparatus of the class described, the combination with a station for filling brick molds, of supporting means for empty molds arranged rearward of said filling station, elements of said supporting means being movable to form an opening or delivery gap, mechanism for separating each mold from the bricks, means for conveying each empty mold from said separating mechanism rearward in the plane of but below said separating mechanism and said filling station and then upwardly through the opening or delivery gap to position the mold on said supporting means, sanding mechanism arranged below said filling station and in the path of movement of the molds for sanding them as they are moved to said supporting means, said conveying means operating to right each mold before delivering it to said sanding mechanism and to invert each mold after being sanded, and means for successively moving the molds from said supporting means to said filling station and then to said separating mechanism 55. In apparatus of the class described, the combination with a station for filling brick molds, of supporting means for empty molds arranged rearward of said filling station, elements of said supporting means being movable to form an opening or delivery gap, mechanism for separating each mold from the bricks, means for conveying each empty mold from said separating mechanism rearward in the plane of but below said separating mechanism and said filling station and then upwardly through the opening or delivery gap onto said supporting means, said conveying means operating to first turn the empty mold up-side down and then right-side up before delivery to said supporting means, and means for successively feeding the molds from said supporting means to said filling station and then to said separating mechanism.

56. An apparatus of the class described, the combination with means for filling molds with material for making brick, of devices for separating the molds from the bricks, mechanism for successively feeding the molds to the filling means and then to said separating devices, means for sanding the molds, means for moving the molds from said sanding means to a position for engagement by said feeding means, said moving means including a movable guide, and a separate guide arranged to receive the empty molds from said sanding means when the movable guide is moved to an inoperative position and direct the molds to a removal station.

57. In apparatus of the class described, the combination of means for filling brick molds with material, a receiver arranged rearward of said filling means, means for feeding molds from said receiver to a position for filling by said filling means, a sanding mechanism, and a pair of guides having their receiving ends arranged at the discharge end of said sanding mechanism, one of said guides leading to a removal station and the other of said guides leading to said receiver, the last mentioned guide being movable to an inoperative position to permit the molds to engage the other guide.

58. In a brick machine, the combination of a mold receiver in the vertical plane of the die box, a filling station beneath said die box and separated from said receiver by a mold delivery gap, an upwardly swingable gate normally closing the gap, and means arranged beneath said receiver for directing a mold inverted or partly inverted through the gap and onto said receiver with its open side uppermost.

59. In a brick machine, the combination of a mold receiver in the vertical plane of the die box, a filling station beneath said die box and separated from said receiver by a mold delivery gap, an upwardly swingable gate normally closing the gap, means arranged beneath said receiver for directing a mold inverted or partly inverted through the gap and onto said receiver with its open side uppermost, and means for stopping the mold at a predetermined position on said receiver.

60. In a brick machine, the combination with a pug mill, of a mold receiver in the vertical plane of the die box, a filling station beneath said die box and separated from said receiver by a mold delivery gap, an upwardly swingable gate normally closing the gap, means arranged beneath said receiver for directing a mold inverted or partly inverted through the gap and onto said receiver with its open side uppermost, and means carried by the pug mill for stopping the mold at a predetermined position on said receiver.

61. In apparatus of the class described, mechanism for substantially simultaneously inverting a brick mold and separating the mold from the bricks, including means for maintaining the supporting elements for the mold and bricks parallel during separation of the mold from the bricks.

62. In apparatus of the class described, the combination of a swingable element arranged to receive a filled brick mold, a pair of members swingable about a common axis, one of said members being arranged to receive and support a pallet and the other of said members being arranged to engage the mold and to move with and also relative to said pallet receiving member, means for operating said mold receiving element and said pallet receiving member to invert and position the mold and bricks on said members, means for causing relative movement between said members during movement of the pallet receiving member to separate the mold from the bricks, and means for maintaining the mold engaging member parallel to the support for the bricks while separation of the mold from the bricks is taking place.

63. In apparatus of the class described, the combination of a swingable element arranged to receive a filled brick mold, a pair of swingable members, one of said members being arranged to receive and support a pallet and the other of said members being arranged to engage the mold and to move with and also relative to said pallet receiving member, means for operating said mold receiving element and said pallet receiving member toward and from each other simultaneously to invert and position the mold and bricks on said members, and means for causing relative movement between said members during movement of the pallet receiving member to separate the mold from the bricks, and means for maintaining said mold engaging member and the support for the bricks parallel during separation of the mold therefrom.

64. In apparatus of the class described, the combination of a pair of relatively movable members swingable from a substantially vertical position to a substantially horizontal position and back again, one of said members being arranged to receive and support a pallet, means for positioning on said members when in a substantially vertical position a filled brick mold, and means for causing relative movement between said members as they swing to a substantially horizontal position to separate the mold from the bricks.

65. In apparatus of the class described, the combination of a pair of relatively movable members swingable from a substantially vertical position to a substantially horizontal position and back again, one of said members being arranged to receive and support a pallet, means for positioning on said members when in a substantially vertical position a filled brick mold, means for causing relative movement between said members as they swing to a substantially horizontal position to separate the mold from the bricks, and devices arranged to receive the empty mold and bricks while said members are in a substantially horizontal position.

66. In apparatus of the character described, the combination of means for moving and supporting a plurality of unattached brick molds through a cycle, means for filling each mold with material when moved to a predetermined position, mechanism arranged at another point in the cycle of movement of said molds for dumping the bricks from the molds, and mechanism arranged at a further point in the cycle of movement of said molds for sanding them ready for filling, said moving and supporting means, said filling means and said dumping and sanding mechanisms being arranged in the same vertical plane.

67. In apparatus of the class described, the combination with a support, of a receiver arranged rearward of said support, means for filling brick molds with material, means for moving the molds from said receiver to a position on said support for filling, a sanding mechanism arranged below and in the vertical plane of said receiver, a guide between said receiver and said sanding mechanism and coöperating with the latter to invert the sanded molds, separate means for moving the molds from said sanding mechanism to said receiver, and means for knocking each mold as it moves relative to said guide.

In testimony whereof I affix my signature, in the presence of a witness.

HENRY W. B. GRAHAM.

Witness:
GEO. B. PITTS.

It is hereby certified that in Letters Patent No 1,341,798, granted June 1, 1920, upon the application of Henry W. B. Graham, of New London, Ohio, for an improvement in "Apparatus for Making Bricks," errors appear in the printed specification requiring correction as follows: Page 14, line 43, strike out the word "free"; page 21, line 68, claim 43, for the words "dumping means for" read *means for dumping;* page 22, line 1, claim 47, after the word "filling" insert a comma; and that the said Letters Patent should be read with these corrections therein that the same may conform to the record of the case in the Patent Office.

Signed and sealed this 20th day of July, A. D., 1920.

[SEAL.]

R. F. WHITEHEAD,
*Acting Commissioner of Patents.*

Cl. 25—2.